United States Patent
Osseiran et al.

(10) Patent No.: US 10,355,768 B2
(45) Date of Patent: Jul. 16, 2019

(54) RADIO ACCESS NODE, RELAY NODE AND METHODS PERFORMED THEREIN

(71) Applicant: TELEFONAKTIEBOLAGET LM ERICSSON (PUBL), Stockholm (SE)

(72) Inventors: Afif Osseiran, Spånga (SE); Ben Slimane, Saltsjö Boo (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 667 days.

(21) Appl. No.: 14/648,770

(22) PCT Filed: Apr. 28, 2015

(86) PCT No.: PCT/SE2015/050477
§ 371 (c)(1),
(2) Date: Jun. 1, 2015

(87) PCT Pub. No.: WO2015/183152
PCT Pub. Date: Dec. 3, 2015

(65) Prior Publication Data
US 2016/0261331 A1 Sep. 8, 2016

Related U.S. Application Data

(60) Provisional application No. 62/003,562, filed on May 28, 2014.

(51) Int. Cl.
*H04B 7/155* (2006.01)
*H04J 3/02* (2006.01)
(Continued)

(52) U.S. Cl.
CPC ..... *H04B 7/15507* (2013.01); *H04B 7/15535* (2013.01); *H04J 3/02* (2013.01);
(Continued)

(58) Field of Classification Search
CPC ... H04B 7/15507; H04B 7/15535; H04J 3/02; H04L 1/00; H04W 40/20; H04W 72/0406; H04W 88/04; H04W 88/08
See application file for complete search history.

(56) References Cited

U.S. PATENT DOCUMENTS

| | | | | |
|---|---|---|---|---|
| 9,036,534 | B2* | 5/2015 | Li | H04W 88/04 370/315 |
| 2004/0054953 | A1* | 3/2004 | Mitchell | G06F 12/0875 714/748 |

(Continued)

FOREIGN PATENT DOCUMENTS

| | | |
|---|---|---|
| EP | 1947782 A1 | 7/2008 |
| WO | 2010030020 A1 | 3/2010 |

(Continued)

OTHER PUBLICATIONS

Laneman, J. N. et al., "Cooperative Diversity in Wireless Networks: Efficient Protocols and Outage Behavior", IEEE Transactions on Information Theory, vol. 50, No. 12, Dec. 2004, pp. 3062-3080.

(Continued)

*Primary Examiner* — Ian N Moore
*Assistant Examiner* — Latresa A McCallum
(74) *Attorney, Agent, or Firm* — Murphy, Bilak & Homiller, PLLC

(57) ABSTRACT

Embodiments herein relate to a method performed by a relay node for relaying user data from/to one or more communication devices to/from a radio access node in a wireless communication network. The relay node receives a first user data stream in a first time slot and/or a second user data stream in a second time slot from a first communication device and a second communication device respectively, or from the radio access node. The relay node independently applies a network coding on the received first and/or second user data streams. The relay node forwards the network (Continued)

coded first user data stream in a third time slot to the radio access node or the first communication device, and/or the second user data stream in another time slot to the radio access node or the second communication device.

16 Claims, 21 Drawing Sheets

(51) Int. Cl.
*H04W 40/20* (2009.01)
*H04W 72/04* (2009.01)
*H04L 1/00* (2006.01)
*H04W 88/08* (2009.01)
*H04W 88/04* (2009.01)

(52) U.S. Cl.
CPC .......... *H04L 1/0059* (2013.01); *H04L 1/0076* (2013.01); *H04W 40/20* (2013.01); *H04W 72/0406* (2013.01); *H04L 2001/0097* (2013.01); *H04W 88/04* (2013.01); *H04W 88/08* (2013.01)

(56) References Cited

U.S. PATENT DOCUMENTS

| | | | | |
|---|---|---|---|---|
| 2006/0251062 | A1* | 11/2006 | Jain | H04L 45/02 370/389 |
| 2009/0067533 | A1* | 3/2009 | Yuan | H04B 7/0697 375/267 |
| 2011/0176477 | A1* | 7/2011 | Lee | H04B 7/15592 370/315 |
| 2012/0028631 | A1* | 2/2012 | Chun | H04L 1/1614 455/422.1 |
| 2013/0084795 | A1* | 4/2013 | Van Phan | H04B 7/15592 455/15 |
| 2013/0208654 | A1 | 8/2013 | Fujii et al. | |
| 2013/0315338 | A1* | 11/2013 | Fitzek | H04B 7/024 375/267 |

FOREIGN PATENT DOCUMENTS

WO 2011018892 A1 2/2011
WO 2012158082 A1 11/2012

OTHER PUBLICATIONS

Li, L. et al., "Interference Cancellation at the Relay for Multi-User Wireless Cooperative Networks", IEEE Transactions on Wireless Communications, vol. 10, No. 3, Mar. 2011, pp. 930-939.
Serbetli, S. et al., "Relay Assisted F/TDMA Ad Hoc Networks: Node Classification, Power Allocation and Relaying Strategies", IEEE Transactions on Communications, vol. 56, No. 6, Jun. 2008, pp. 937-947.
Wang, L. et al., "Cooperative Communication for Spatial Frequency Reuse Multihop Wireless Networks under Slow Rayleigh Fading", 2011 International Conference on Communications (ICC), Kyoto, Japan, Jun. 5-9, 2011, pp. 1-6.
Ahlswede, Rudolf et al., "Network Information Flow", IEEE Transactions on Information Theory, vol. 46, Issue 4, Jul. 2000, 1204-1216.
Ahsin, Tafzeel Ur Rehman et al., "Detection Strategies in Cooperative Relaying with Network Coding", 2010 IEEE 21st International Symposium on Personal Indoor and Mobile Radio Communications, 2010, 12-17.
Chebli, Lena et al., "Cooperative Uplink of two Mobile Stations with Network Coding based on the WiMax LDPC Code", IEEE Globecom 2009 Proceedings, Institute for Communications Engineering, Munich, Germany, 2009, 1-6.
Chen, Yingda et al., "Wireless Diversity Through Network Coding", IEEE Communications Society, WCNC 2006 Proceedings, 2006, 1681-1686.
Hausl, Christopher et al., "Iterative Network and Channel Decoding on a Tanner Graph", 43rd Annual Allerton Conference on Communication, Control, and Computing, Monticello, USA, 2006, 1-10.
Hausl, Christopher et al., "Joint Network-Channel Coding for the Multiple-Access Relay Channel", SECON '06, 3rd Annual IEEE Communications Society on in Sensor and Ad Hoc Communications and Networks, vol. 3, 2006, 817-822.
Ho, Tracey et al., "The Benefits of Coding over Routing in a Randomized Setting", Proceedings of International Symposium on Information Theory, Yokohama, Japan, Jun. 2003, 1-6.
Li, Shuo-Yen R. et al., "Linear Network Coding", IEEE Transactions on Information Theory, vol. 49, No. 2, Feb. 2003, 371-381.
To, Duc et al., "Convolutional Codes in Two-Way Relay Networks with Physical-Layer Network Coding", IEEE Transactions on Wireless Communications, vol. 9, No. 9, Sep. 2010, 2724-2729.
Woldegebreal, Dereje H. et al., "Multiple-Access Relay Channel with Network Coding and Non-Ideal Source-Relay Channels", IEEE ISWCS 2007, Piscataway, NJ, Oct. 1, 2007, 732-736.
Wu, Yunnan et al., "Information Exchange in Wireless Networks with Network Coding and Physical-layer Broadcast", 2005 Conference on Information Sciences and Systems, The Johns Hopkins University, Mar. 16-18, 2005, 1-6.
Asaduzzaman, et al., "Code Combining in Cooperative Communication", IEICE Transactions on Communications, Communications Society, Tokyo, JP, vol. E91B, No. 3, Mar. 1, 2008, pp. 805-813.
Hedayat, Ahmadreza et al., "Coded Cooperation in Wireless Communications: Space-Time Transmission and Iterative Decoding", IEEE Transactions on Signal Processing, vol. 52, No. 2, Feb. 1, 2004, pp. 362-371.
Li, Liangbin et al., "Interference Cancellation at the Relay for Multi-User Wireless Cooperative Networks", Arxiv.org., Cornell University Library, 201 Olin Library Cornell University Ithaca, NY 14853, Apr. 21, 2010, pp. 1-23.

* cited by examiner

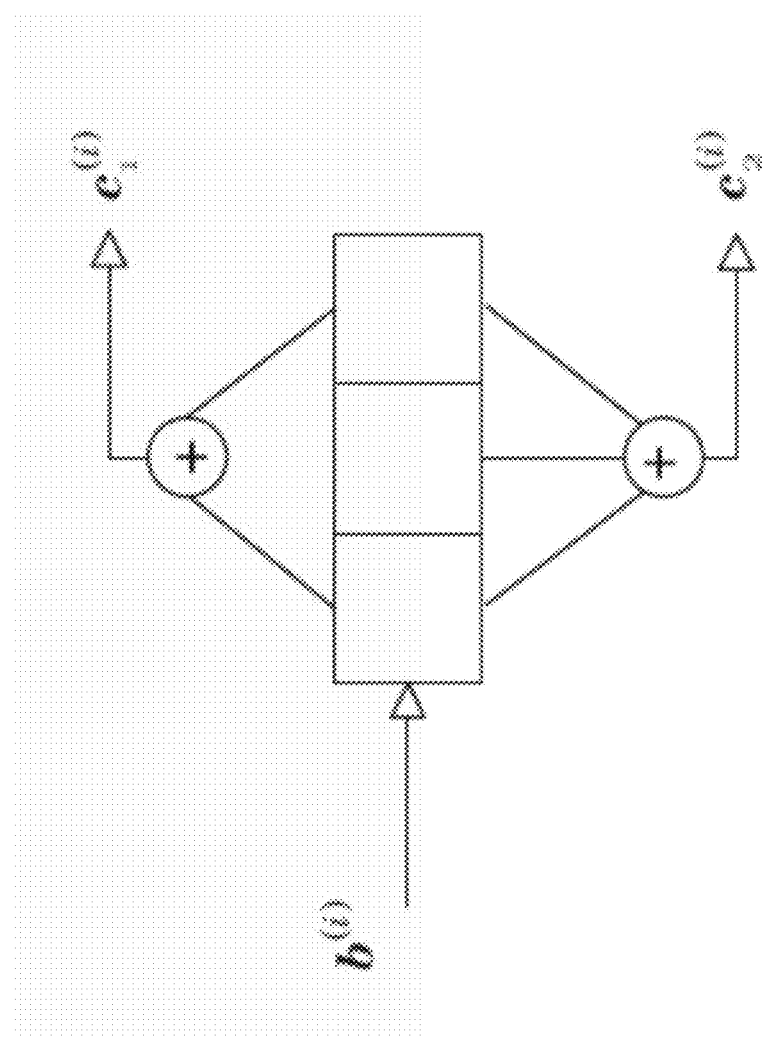

RADIO ACCESS NODE, RELAY NODE AND METHODS PERFORMED THEREIN

TECHNICAL FIELD

Embodiments herein relate to a radio access node, a relay node, methods performed therein, a computer program, and a computer-readable storage medium. In particular, embodiments herein relate to handling user data to/from communication devices.

BACKGROUND

In a typical radio communications network, communication devices, also known as mobile stations and/or user equipments (UEs), communicate via a Radio Access Network (RAN) to one or more core networks. The RAN covers a geographical area which is divided into cell areas, with each cell area being served by a Base Station (BS), e.g., a radio base station (RBS), which in some networks may also be called, for example, a "NodeB" or "eNodeB". A cell is a geographical area where radio coverage is provided by the radio base station at a base station site or an antenna site in case the antenna and the radio base station are not collocated. Each cell is identified by an identity within the local radio area, which is broadcast in the cell. Another identity identifying the cell uniquely in the whole mobile network is also broadcasted in the cell. One base station may have one or more cells. A cell may be downlink and/or uplink cell. The base stations communicate over the air interface operating on radio frequencies with the user equipments within range of the base stations.

A Universal Mobile Telecommunications System (UMTS) is a third generation mobile communication system, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some versions of the RAN as e.g. in UMTS, several base stations may be connected, e.g., by landlines or microwave, to a controller node, such as a radio network controller (RNC) or a base station controller (BSC), which supervises and coordinates various activities of the plural base stations connected thereto. The RNCs are typically connected to one or more core networks.

Specifications for the Evolved Packet System (EPS) have been completed within the $3^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access, and the Evolved Packet Core (EPC), also known as System Architecture Evolution (SAE) core network. E-UTRAN/LTE is a variant of a 3GPP radio access technology wherein the radio base station nodes are directly connected to the EPC core network rather than to RNCs. In general, in E-UTRAN/LTE the functions of a RNC are distributed between the radio base stations nodes, e.g. eNodeBs in LTE, and the core network. As such, the Radio Access Network (RAN) of an EPS has an essentially "flat" architecture comprising radio base station nodes without reporting to RNCs.

A main striving force in the development of wireless/cellular communication networks and systems is to provide, apart from many other aspects, increased coverage or support of higher data rate, or a combination of both. At the same time, the cost aspect of building and maintaining the system is of great importance and is expected to become even more so in the future. As data rates and/or communication distances are increased, the problem of increased battery consumption is another area of concern. Until recently the main topology of wireless communication systems has been fairly unchanged, including the three existing generations of cellular networks. The topology of existing wireless communication systems is characterized by the cellular architecture with the fixed radio base stations and the communication devices as the only transmitting and receiving entities in the networks typically involved in a communication session.

One way to introduce diversity in a received signal is to exploit the spatial diversity offered when multiple antennas are used at the transmitter with the possibility of using one or more antennas at the receiver. The use of multiple antennas offers significant diversity and multiplexing gains relative to single antenna systems, Multiple-Input Multiple-Output (MIMO) wireless systems can thus improve the link reliability and the spectral efficiency relative to Single-Input Single-Output (SISO) systems. Another method that offers macro-diversity is relaying systems also referred to as distributed systems, such as Distributed Antenna Systems (DAS), or cooperative relaying systems.

A relaying system is a conventional radio network that is complemented with relay nodes. The relay nodes communicate wirelessly with other network elements, e.g. Base Stations (BS), another relay node or a user equipment (UE).

A cooperative relaying system is a relaying system where the information sent to an intended destination is conveyed through various routes and combined at the destination. Each route may comprise one or more hops utilizing the relay nodes. In addition, the destination node may receive the direct signal from the source. Cooperative relaying systems may be divided into numerous categories based on desired parameters. For instance the way the signal is forwarded and encoded at the relay station may be classified into two categories: amplify-and-forward and decode-and-forward. As its name indicates, in amplify-and-forward systems the relay nodes simply amplify and forward the received signal. In the decode-and-forward case, the relay nodes demodulate and decode the signal prior to re-encoding and retransmission. The present-day communication networks, mentioned above, share the same fundamental principle of operation: the information or packet sent from one source, $O_1$, to a destination, D, is transported independently from other information sent from another source, $O_2$, to the same destination, D. Routers, repeaters or relays simply forward the data to the destination D. In contrast to those communication networks, Network Coding (NC) is a new area of networking, in which data is manipulated inside the network, e.g. at an intermediate node, N, to improve throughput, delay, and robustness. In particular, NC allows the nodes to instead recombine several input packets into one or several output packets. At the intermediate node N, may also be referred to a network coding node, some linear coding could be performed on the packets present at the network coding node, and the resulting encoded packet may be broadcasted for different recipients simultaneously instead of transmitting each packet separately.

The area of network coding was first introduced by Ahlswede et al. in [ACLY00]. In Ahlswede, network coding was presented as a method that allows intermediate nodes to perform some processing, e.g. coding, on the packets they receive, in exchange for throughput gain. In [LYC03], the authors showed that linear network coding is sufficient to achieve the maximum low bounds between the source-destination pairs in wired networks. Ho et al. extended this result and showed in [HKM+03] that a random linear combination of packets is enough to achieve the capacity for multicast traffic. Moreover, these works mainly targeted wired networks. Nevertheless, researchers soon came to realize that the broadcast property of the wireless medium makes it a natural environment for the application of network coding.

Up to the 2006, only few works [WCK05, CKL06] have hitherto considered a network coding solution for wireless communication networks. Since then, a plethora of work of applying NC to wireless communications has flourished, in particular in the scenarios of Multiple Access Relay Channel (MARC), bidirectional relaying, also called two-way relaying, and multi-cast transmission. When NC is used, it can be deployed either separately or jointly with channel coding. Although the Separate Network-Channel Coding (SNCC) approach has been the most commonly assumed [AB10], the Joint Network-Channel Coding (JNCC) has been considered and studied. It was shown that the JNCC in [HSO05, HD06, Hau08] exploits more effectively the relay transmission as additional redundancy, and not only to obtain diversity gain, especially in the case of MARC scenario. Finally Du To et al. [TC10] have recently proposed to extend joint network-channel coding to the two-way relaying scenario.

Problems with Existing Solutions

The existent network coding scheme in e.g. the MARC scheme combines the signals of the cooperating communication devices at the relay node as illustrated in FIG. 1 [WK07]. In FIG. 1, two communication devices cooperate through a Relay Node (RN). To get the best of this kind of network coding is to employ joint detection using JNCC [HD06, Hau08] or Low Density Parity Check (LDPC) codes [CHZK09]. This requires more complex decoder structures that necessitates an iterative decoding and relies on exchanging soft information between the decoders at the receiver. Besides the exorbitant complexity of the decoding operation, it is vulnerable to error propagation due to the usage of soft information between the decoders. When the cooperating communication devices are employing convolutional codes, the optimum decoder is a Viterbi decoder based on the combined channel-network coding schemes.

In the MARC scheme, three orthogonal coded words are received at the BS, two directly from the communication devices and one from the relay node. By considering the three received coded words together, one can see the combined convolutional code and network coding as an augmented convolutional code with a total number states $v_1 \times v_2$ where $v_i$ is the number of states of the convolutional code used by communication device i [BSO12]. Hence, using these three received coded words, the decoder at the BS can apply a single Viterbi algorithm to decode the information of the two cooperating communication devices. In that, the decoder will consider as if the output of the encoder consisted of three encoded sequences, e.g. $c^{(1)}$, $c^{(2)}$ and c, instead of decoding each encoded sequence separately. This gives a channel-network decoding applied to a constituent or composite encoder. For instance if communication device i employs a convolutional code with rate $R_i=k_i/n_i$ and a total number of states $v_i$, where $k_i$ is the length of the information bits, i.e. input at the encoder, and $n_i$ the size of coded block length, i.e. output of the encoder. Then the equivalent code that takes into account the network operation at the relay node and the coding operations at the communication devices, seen at a base station receiver is a convolutional code with rate $$Re = \frac{k_1 + k_2}{n_1 + n_2 + \max\{n_1, n_2\}}$$

and a total number of states $v_1 \times v_2$. Hence, the complexity of the joint decoder of conventional MARC with network coding increases exponentially with the number of cooperating communication devices while its free Hamming distance is twice that of the individual user channel code which may not be optimum for a convolutional code of the same constraint length.

For instance, if the channel encoder at the communication device is a convolutional encoder of constraint length K=3 as depicted in FIG. 2a with input bit stream $b^{(i)}$, and output encoded sequences $c_1^{(i)}$, $c_2^{(i)}$, the equivalent encoder of the JNCC is rate ⅔ 16 state convolutional code as illustrated in FIG. 2b where input streams $b^{(1)}$, $b^{(2)}$ that are jointly encoded into encoded sequences $c_1^{(1)}$, $c_2^{(1)}$, $c_1^{(2)}$, $c_2^{(2)}$, $c_1$, $c_2$. It is to verify that a free Hamming distance of this encoder is $d_{free}=10$.

Another limitation of conventional MARC with network coding is the difficulty in combining communication devices with different data rates and also the cooperating communication devices need to be close to the same relay node, since if one or the two communication devices are far away from the cooperating relay node, the relay node will not be able to hear the communication devices and no cooperation will be possible. In the conventional MARC, communication devices cooperate through the same relay node. This limits the cooperation within the cell. Furthermore, the relay node needs to decode the messages of the different cooperating communication devices before applying network coding and forwarding the obtained message to the final destination. This puts limitations on the possible communication devices that can cooperate. In other words, the cooperating communication devices need to be in proximity of the same relay node for the MARC scheme to operate properly and provide possible gain. This leads to an inflexible solution that only in certain situations shows an improved performance of wireless communication network using relay nodes.

SUMMARY

An object of embodiments herein is to provide a mechanism that improves performance of a wireless communication network when using a relay node or nodes, such as fixed relay nodes.

The object may be achieved by providing a method performed by a relay node for relaying user data from/to one or more communication devices to/from a radio access node in a wireless communication network. The relay node receives a first user data stream and/or a second user data stream from a first communication device and a second communication device respectively, or from the radio access node. The first user data stream is comprised in a first time slot and/or the second user data stream is comprised in a second time slot. The relay node applies a network coding on the received first user data stream, independently of the second user data stream, into a network coded first user data stream, and/or the relay node applies a network coding on the received second user data stream, independently of the first user data stream, into a network coded second user data stream. The relay node further forwards the network coded first user data stream in a third time slot to the radio access node or the first communication device, and/or the relay node forwards the network coded second user data stream in the third time slot to the radio access node or the second communication device. The network coded first user data stream and network coded second user data stream are forwarded in an orthogonal manner relative one another.

The object may be achieved by a method performed by a radio access node for decoding user data from a first communication device and a second communication device in a wireless communication network. The radio access node receives a first user data stream in a first time slot from the first communication device, a second user data stream in a second time slot from the second communication device, and a network coded first user data stream in a third time slot and a network coded second user data stream in the third time slot from one or more relay nodes. The network coded first user data stream and the network coded second user data stream are orthogonal relative one another. The radio access node decodes the first user data stream from the first and third time slot, and the second user data stream from the second and the third time slot, separately.

Furthermore, a relay node and a radio access node are provided herein to perform the methods herein. Thus, the object is achieved by providing the relay node for relaying user data from/to one or more communication devices to/from a radio access node in a wireless communication network. The relay node is configured to receive a first user data stream and/or a second user data stream from a first communication device and a second communication device respectively, or from the radio access node. The first user data stream is comprised in a first time slot and/or the second user data stream is comprised in a second time slot. The relay node is further configured to apply a network coding on the received first user data stream, independently of the second user data stream, into a network coded first user data stream, and/or the received second user data stream, independently of the first user data stream, into a network coded second user data stream. Furthermore, the relay node is configured to forward the network coded first user data stream in a third time slot to the radio access node or the first communication device, and/or the second user data stream in the third time slot to the radio access node or the second communication device. The network coded first user data stream and the network coded second user data stream are forwarded in an orthogonal manner relative one another.

The object is further achieved by providing a radio access node for decoding user data from a first communication device and a second communication device in a wireless communication network. The radio access node is configured to receive a first user data stream in a first time slot from the first communication device, a second user data stream in a second time slot from the second communication device, and, from one or more relay nodes, a network coded first user data stream in a third time slot and a network coded second user data stream in the third time slot. The network coded first user data stream and the network coded second user data stream are orthogonal relative one another. The radio access node is further configured to decode the first user data stream from the first and the third time slot, and the second user data stream from the second and the third time slot, separately.

Embodiments herein further provide a computer program comprising instructions which, when executed on at least one processor, cause the at least one processor to carry out the methods according the embodiments herein. Furthermore, embodiments herein provide a computer-readable storage medium, having stored thereon the computer program, comprising instructions which, when executed on at least one processor, cause the at least one processor to carry out the methods according the embodiments herein.

The proposed methods disclose a new cooperation procedure for an uplink relay channel such as an uplink multiple access relay channel (MARC) and also for a downlink relay channel e.g. a down-link broadcasting relay channel. The proposed scheme considers network coding at the relay node. The idea of network coding is that network coding is applied to each user data stream separately. In that, the relay node applies network coding on each user data stream separately and forwards the network coded user data streams or signals, in an orthogonal fashion, and no correlation between the user data streams of the different communication devices exists. This procedure allows both communication devices to take advantage of network coding at the relay node without increasing the complexity of a receiver at the radio access node or the communication device. In that, the received signals at the radio access node or the communication device are orthogonal and each user data is decoded separately and joint multi-user detection is avoided. The network coding may also be combined well with the convolutional channel codes of the individual communication devices and allows the design of optimum network codes for a given convolutional channel code.

BRIEF DESCRIPTION OF THE DRAWINGS

FIG. 2a: Example of convolutional encoder at the communication device of constraint length K=3, free Hamming distance 5, and generator matrix (5, 7).

FIG. 2b: Equivalent encoder of the joint channel-network coding scheme for MARC when the individual channel code of the communication device is as given in FIG. 2a.

FIG. 5: Trellis diagram of the convolutional encoder of FIG. 2a.

DETAILED DESCRIPTION

Figure 3A:
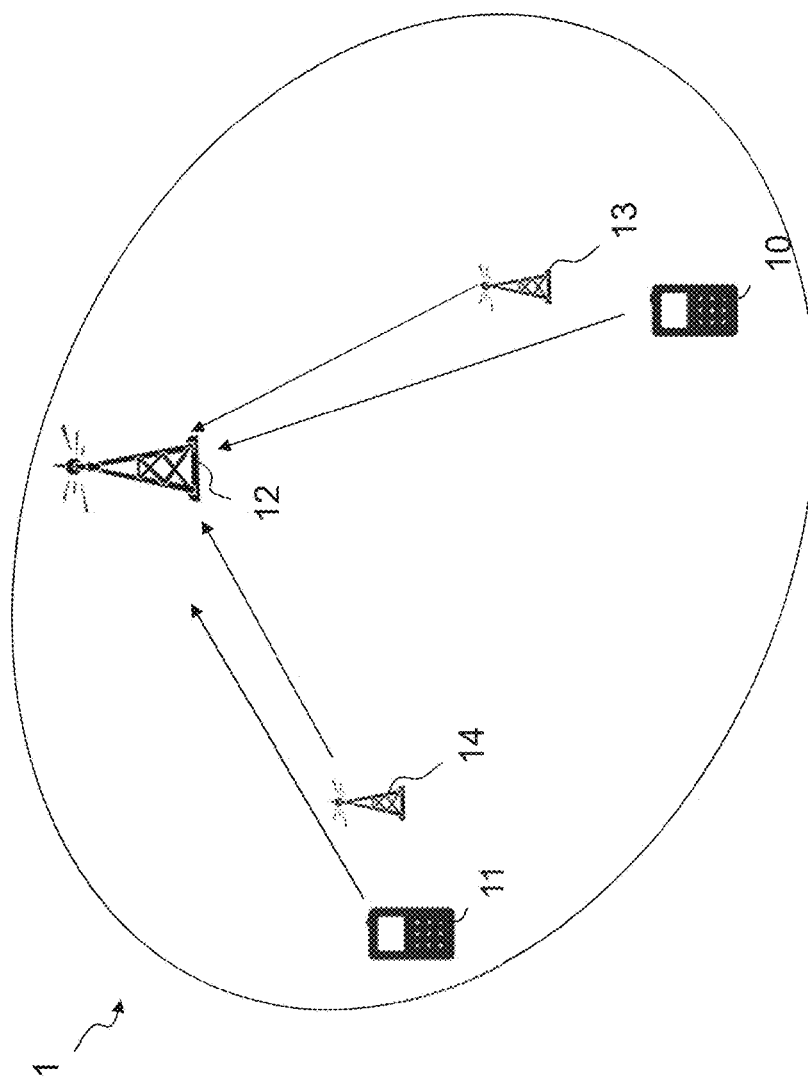
FIG. 3a: A schematic overview depicting a wireless communication network according to embodiments herein.

Embodiments herein relate to wireless communication networks in general. FIG. 3a is a schematic overview depicting a wireless communication network 1. The wireless communication network 1 comprises one or more RANs and one or more CNs. The wireless communication network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The wireless communication network 1 is exemplified herein as an LTE network.

In the wireless communication network 1, a first communication device 10 and/or a second communication device 11, such as mobile stations, user equipments and/or wireless terminals, communicate via a Radio Access Network (RAN) to one or more core networks (CN). It should be understood by the skilled in the art that "communication device" is a non-limiting term which means any terminal, wireless terminal, user equipment, Machine Type Communication (MTC) device, a Device to Device (D2D) terminal, or node e.g. Personal Digital Assistant (PDA), laptop, mobile phone, sensor, relay, mobile tablets or even a small base station communicating within a cell.

The wireless communication network 1 covers a geographical area which is divided into cell areas, e.g. a cell being served by a radio access node 12. The radio access node 12 may also be referred to as a radio base station and e.g. a NodeB, an evolved Node B (eNB, eNode B), a base transceiver station, Access Point Base Station, base station router, access point, Wi-Fi access point, or any other network unit capable of communicating with a communication device within the cell served by the radio access node 12 depending e.g. on the radio access technology and terminology used. The radio access node 12 may serve one or more cells.

A cell is a geographical area where radio coverage is provided by radio equipment at e.g. a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell uniquely in the whole wireless communication network 1 is also broadcasted in the cell. The radio access node 12 communicates over the air or radio interface operating on radio frequencies with the communication devices 10,11 within range of the radio access node 12. The communication devices transmit data over the radio interface to the radio access node 12 in Uplink (UL) transmissions and the radio access node 12 transmits data over an air or radio interface to the communication devices 10,11 in Downlink (DL) transmissions.

Furthermore, the wireless communication network 1 comprises a relay node 13 also referred to as first relay node. The relay node 13 is a forwarding node configured to forward transmissions to/from the communication devices 10,11 from/to the radio access node 12 extending or improving coverage of the wireless communication network 1. It should be understood that the relay node 13 may be a standalone node with own radio equipment as illustrated, also called a fixed relay node, a standalone node interfacing or sharing another radio node, or be integrated with another radio node. The relay node 13 may be a communication device such as a user equipment, a radio base station, a radio node, a communication node or similar.

It should also be understood that the wireless communication network 1 may comprise another relay node, a second relay node 14, forwarding data from e.g. one of the communication devices 10,11 from another section of the cell served by the radio access node 12.

According to embodiments herein a solution is provided where a relay node, e.g. the first relay node 13, applies network coding on a user data stream received from/to at least one of cooperative communication devices e.g. the first communication device 10. The network coding is separated or independently of the other user data stream of the other communication device, e.g. the second communication device 11. This results in a coded stream that can be decoded in an efficient manner leading to an improved performance of the wireless communication network 1. It should be understood that the second relay node 14 may act accordingly and apply network coding on a user data stream received from/to the second communication device 11.

Figure 3B:
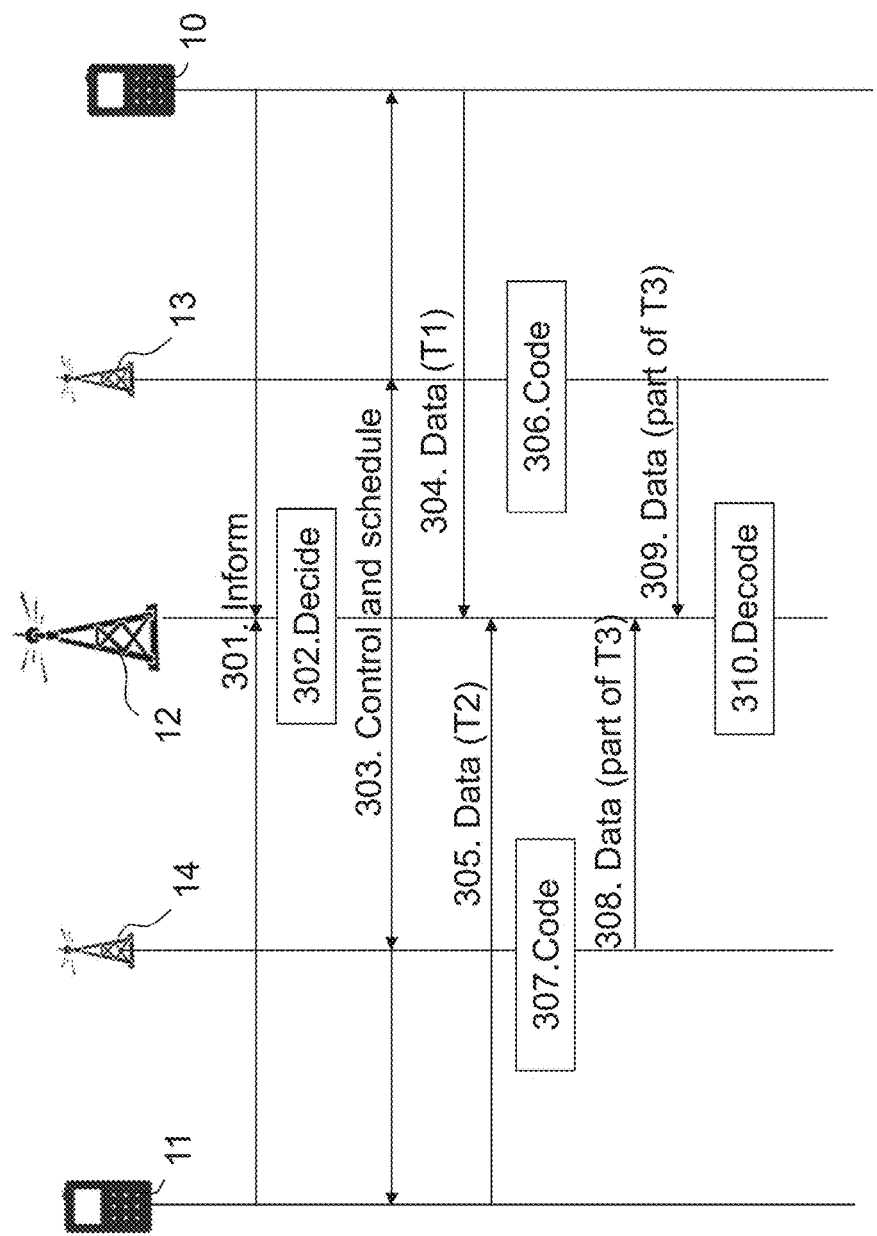
FIG. 3b. A combined flowchart and signaling scheme according to embodiments herein.

FIG. 3b is a schematic combined flowchart and signaling scheme according to embodiments herein.

Action 301. The first relay node 13 and the second relay node 14 may detect the first communication device 10 and the second communication device 11, respectively, e.g. each relay node receives signaling from each communication device, and informs the radio access node 12.

Action 302. The radio access node may decide e.g. based on signal strength, quality or similar, to set up a cooperation communication for the communication devices.

Action 303. The radio access node 12 may configure or setup the first relay node 13 and the second relay node 14, and the communication devices 10,11 for cooperation communication. E.g. schedule grant, resource or similar for the communication devices and relay nodes.

Action 304. The first communication device 10 transmits data in a first user data stream in a first time slot to the radio access node 12.

Action 305. The second communication device 11 transmits data in a second user data stream in a second time slot to the radio access node 12.

Action 306. The first relay node 13 receives the first user data stream and applies network coding on the received first user data stream separately of the second user data stream into e.g. a first part of a third time slot.

Action 307. The second relay node 14 receives the second user data stream and applies network coding on the received second user data stream separately of the first user data stream into e.g. a different part of the third time slot, separated from first part.

Action 308. The first relay node 13 then forwards/transmits the network coded first user data stream in the first part of the third time slot to the radio access node 12.

Action 309. The second relay node 14 then forwards/transmits the network coded second user data stream in the different part of the third time slot to the radio access node 12. The network coded user data streams are transmitted in an orthogonal manner relative one another in the third time slot.

Action 310. The radio access node 12 decodes the first user data stream, e.g. jointly, from the first and third time slot, and the second user data stream, e.g. jointly, from the second and third time slot, separately in a non-complex manner. That is, the first user data stream and the second user data stream are decoded separately.

Figure 3C:
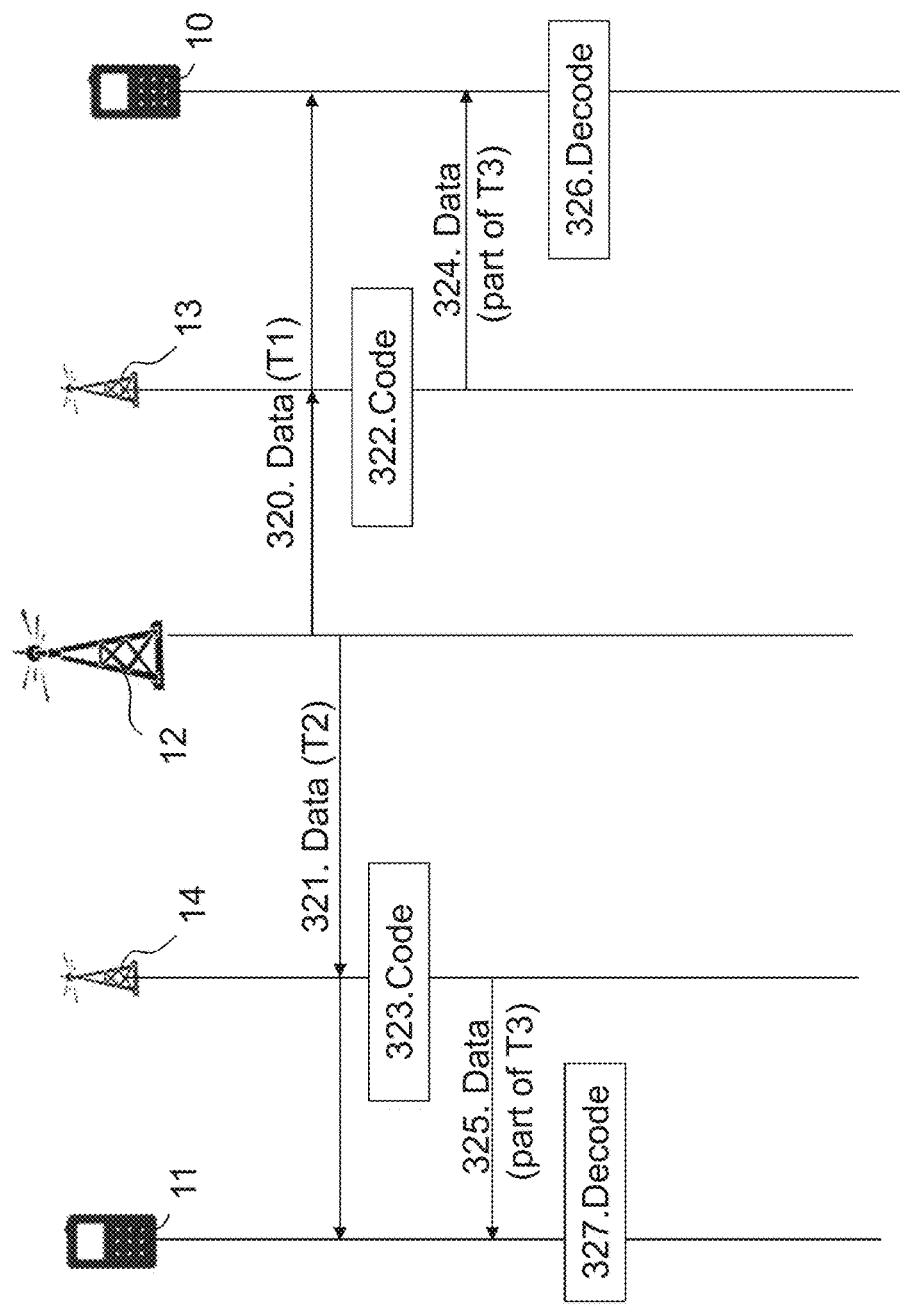
FIG. 3c. A combined flowchart and signaling scheme according to embodiments herein.

FIG. 3c is a schematic combined flowchart and signaling scheme according to embodiments herein. The first and second relay nodes are synchronized and set up for cooperation operation.

Action 320. The radio access node 12 transmits data in a first user data stream in a first time slot to the first communication device 10 and the first relay node 13.

Action 321. The radio access node 12 further transmits data in a second user data stream in a second time slot to the second communication device 11 and the second relay node 14.

Action 322. The first relay node 13 receives the first user data stream and applies network coding on the received first user data stream separately of the second user data stream into e.g. a first part of a third time slot.

Action 323. The second relay node 14 receives the second user data stream and applies network coding on the received second user data stream separately of the first user data stream into e.g. a different part of the third time slot, separated from first part.

Action 324. The first relay node 13 then forwards/transmits the network coded first user data stream in the first part of the third time slot to the first communication device 10.

Action 325. The second relay node 14 then forwards/transmits the network coded second user data stream in the different part of the third time slot to the second communication device 11. The network coded user data streams are transmitted in an orthogonal manner relative one another in the third time slot.

Action 326. The first communication device 10 decodes the first user data stream from the first and third time slot.

Action 327. The second communication device 11 decodes the second user data stream from the second and third time slot.

Assume, in the uplink MARC scheme, that the communication device 10 transmits two consecutive modulated symbols, denoted $s_1^{(1)}=M(c_1^{(1)})$, $s_2^{(1)}=M(c_2^{(1)})$, during the first time slot and the second communication device 11 transmits two consecutive symbols, denoted by $s_1^{(2)}=M(c_1^{(2)})$, $s_2^{(2)}=M(c_2^{(2)})$, during the second time slot with $M(\cdot)$ denoting the binary modulation mapping operator and $C_i^j$ is the i.th transmitted bit of communication device j. These four symbols are received by the radio access node 12 and the respective relay node. The respective relay node decodes the received symbols and forms the following symbols, denoted by $s_3^{(1)}$, $s_3^{(2)}$, to forward to the radio access node receiver during the third time slot:

$$s_3^{(1)}=M(\alpha c_1^{(1)} \boxplus \beta c_2^{(1)}) \quad (1)$$

$$s_3^{(2)}=M(\alpha c_1^{(2)} \boxplus \beta c_2^{(2)}) \quad (2)$$

where $\alpha, \beta \in \{0,1\}$

Figure 4:
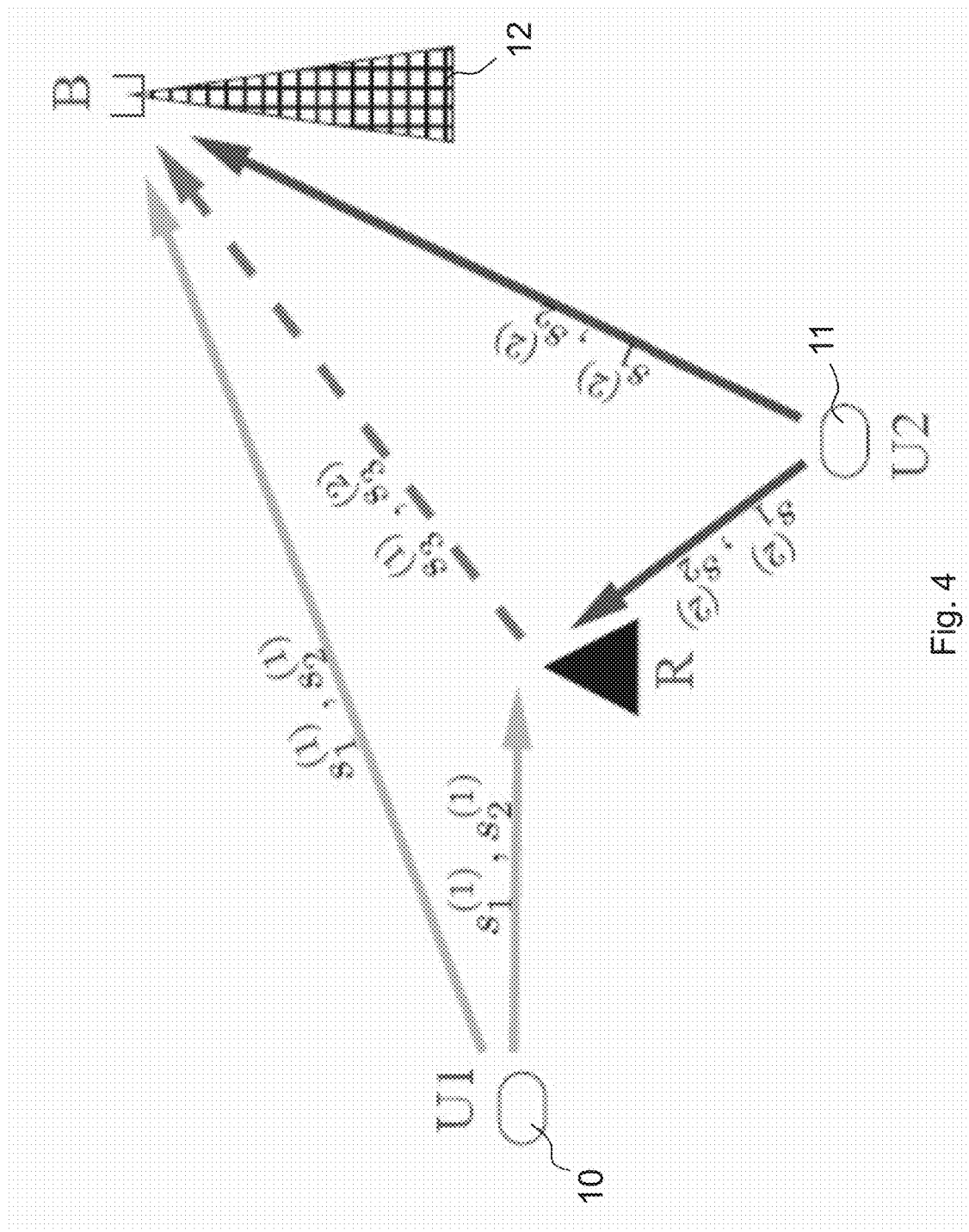
FIG. 4: MARC scheme with the new user network coding structure. $s_j^{(i)}=M(c_j^{(i)})$; i, j=1, 2 and $s_3^{(i)}=M(c_1^{(i)} \oplus c_2^{(i)})$; i=1, 2 with $M(\cdot)$ representing the binary modulation mapping operator.

The above procedure is illustrated in FIG. 4 for the MARC scheme where one relay node R is handling the forwarding data from two wireless devices U1 and U2. Here the two communication device 10,11 share the relay node R in an orthogonal time division access fashion, i.e. orthogonal manner, without direct mixing of their symbols. This procedure will facilitate the radio access node receiver job since no user separation is needed at the radio access node 12. The two information is already separated which simplifies the receiver considerably without affecting the diversity gain achieved by both communication devices. To decode the information of communication device i the receiver of the radio access node 12 uses the three received symbols $\{s_1^{(i)}, s_2^{(i)}, s_3^{(i)}\}$, i=1, 2. The choice of modulation/coding scheme for the first communication device 10 will not be restricted by that used by the second communication device 11 and vice versa. The performance of the scheme, in terms of diversity gain, will be exactly the same as that of conventional XOR-based network coding where the coding is applied along the communication devices. However, this network coding scheme according to embodiments herein has more flexibility as it allows communication devices to employ different modulation and different channel coding schemes. In-fact, there is no restriction on what modulation is used by any communication device. It allows single communication device detection with full diversity gain. In the case of channel coding, it is possible to select the network coding such that the overall channel coding scheme is optimum. It could be the solution to rate maximization for the two way relaying scheme.

Combined Network Coding Scheme and Convolutional Codes

The network coding scheme according to embodiments herein combines very well with channel coding. Since the network coding scheme is applied on consecutive symbols of the same communication device, it is possible to select the network coding scheme such that the overall performance of the communication device in the wireless communication network is optimized.

Figure 1:
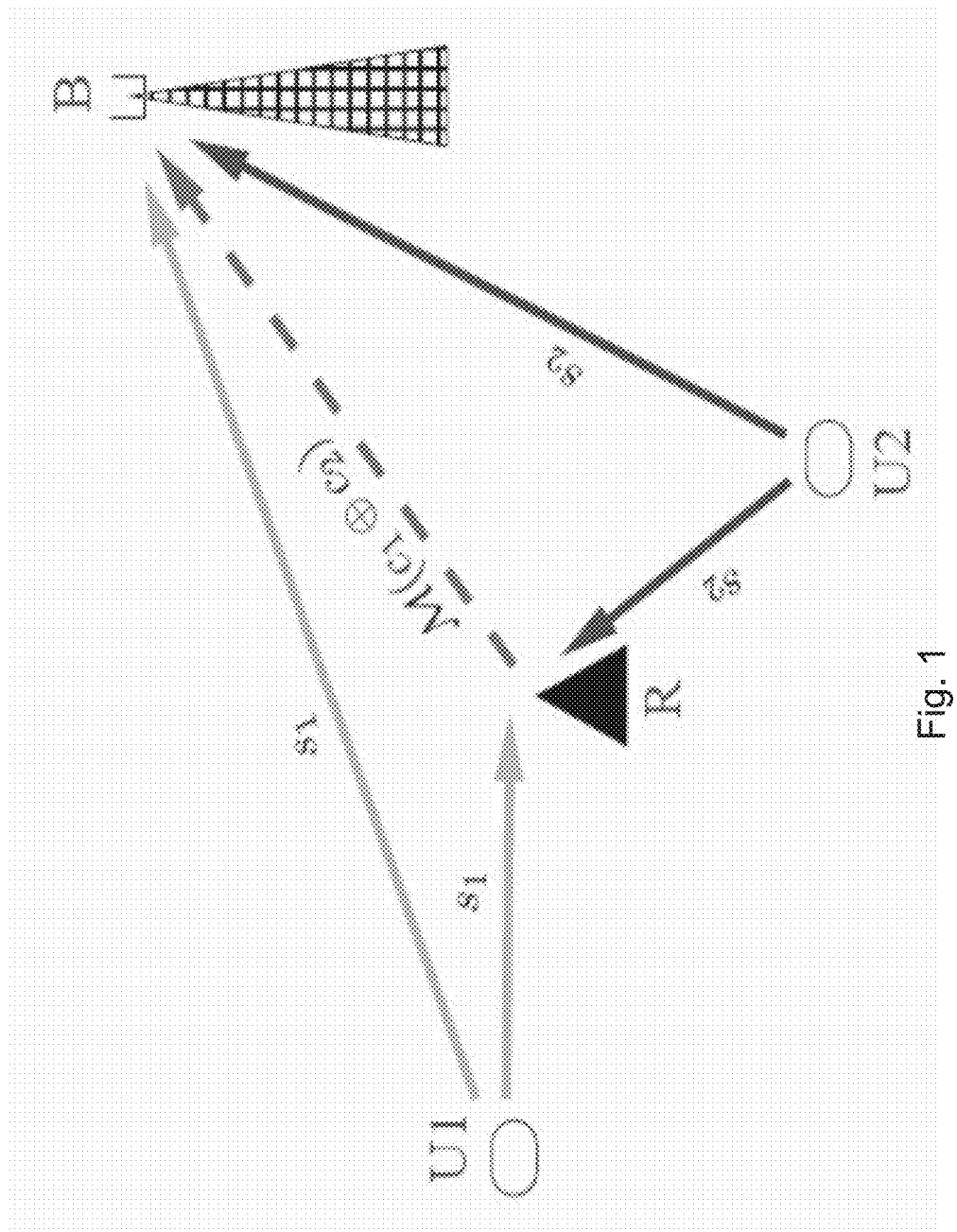
FIG. 1: Conventional MARC scheme with XOR-based network coding. $c_i$ is the transmitted bit and $s_i=M(c_i)$ is the modulated symbol with $M(\square)$ denoting the binary modulation operator.
Figure 2B:
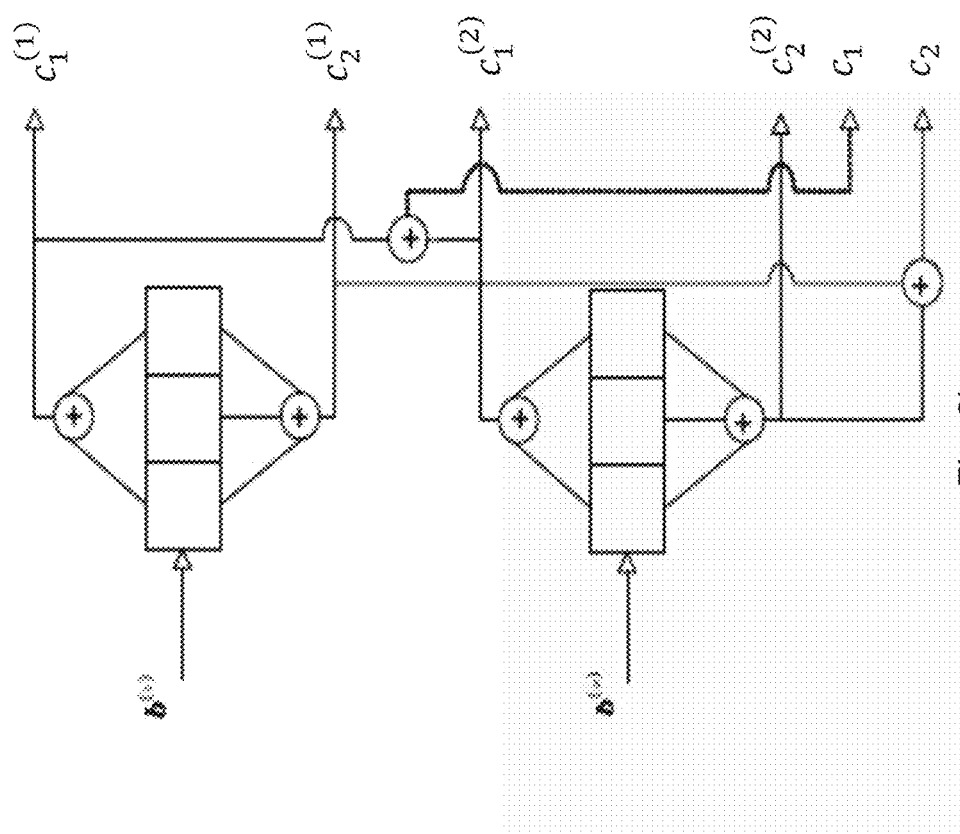
Figure 5:
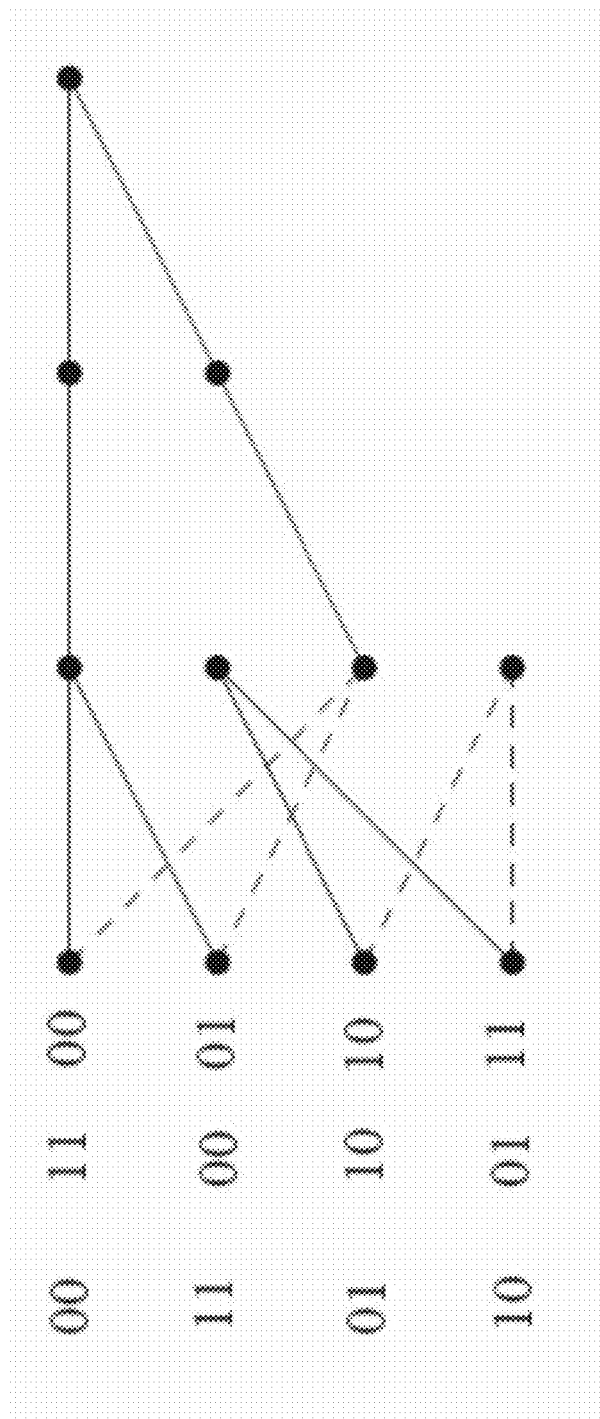

Let us consider a rate ½ 4 state convolutional code with the encoder shown in FIG. 2a and the trellis diagram shown in FIG. 5 [Pro01]. The trellis diagram shows the possible states that the data goes through in the time domain and this diagram is used by an algorithm at the receiver to trace the correct data or path through the trellis. This convolutional code is an optimum rate ¼ 4 state convolutional code with a minimum free distance of $d_{free}=5$.

Figure 6:
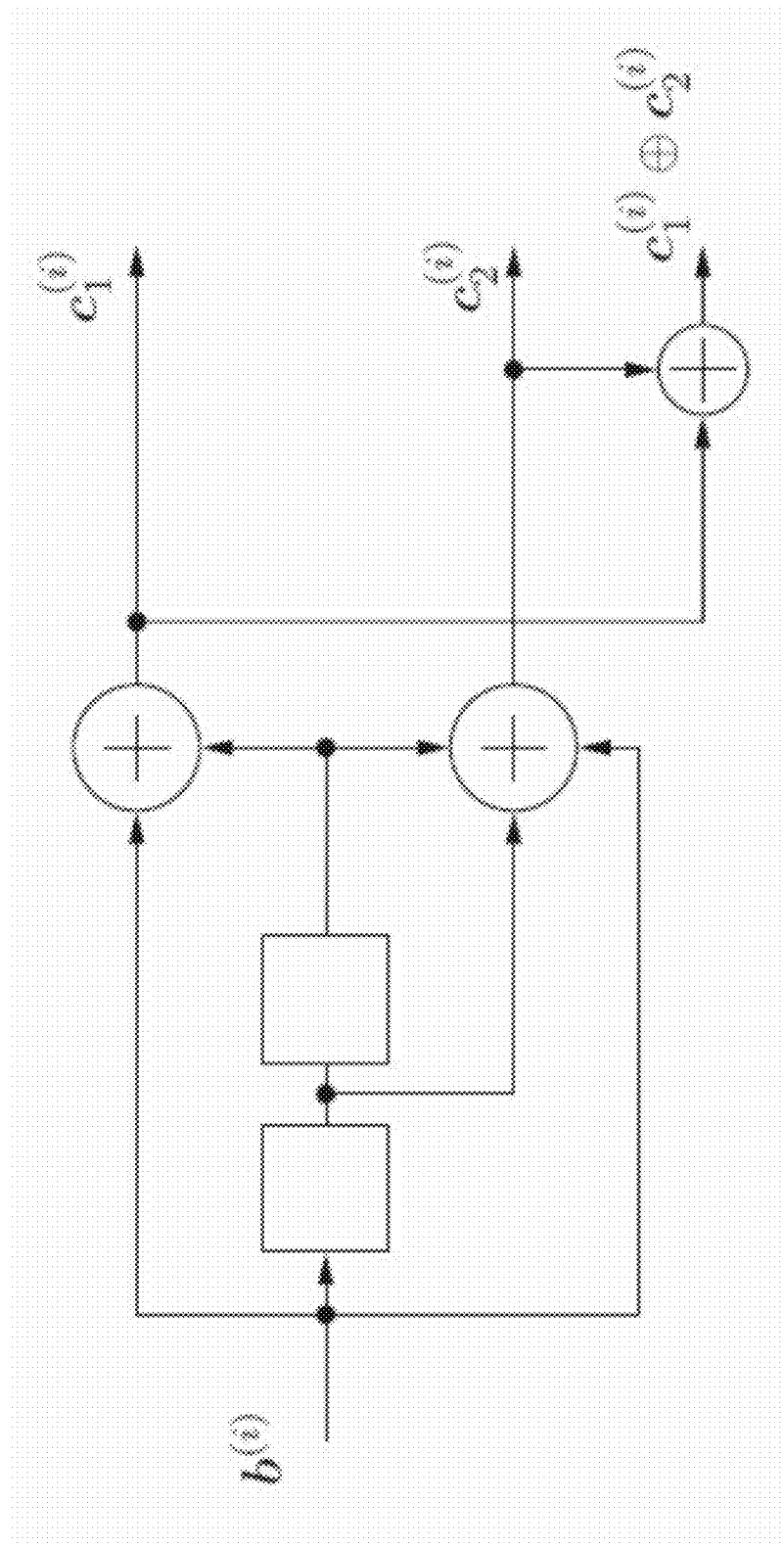
FIG. 6: Encoder of the joint channel network coding for communication device i when $\alpha=1$ and $\beta=1$.
Figure 7:
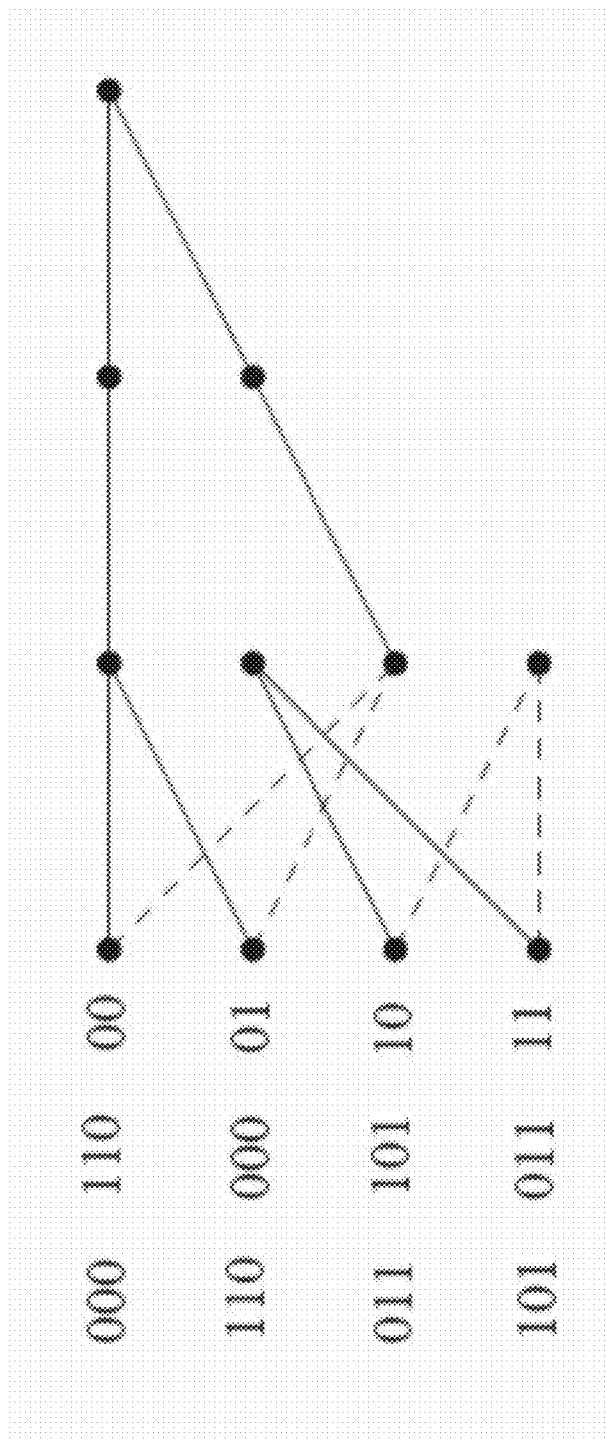
FIG. 7: Trellis diagram of the joint network channel coding for communication device i when $\alpha=1$ and $\beta=1$.
Figure 8:
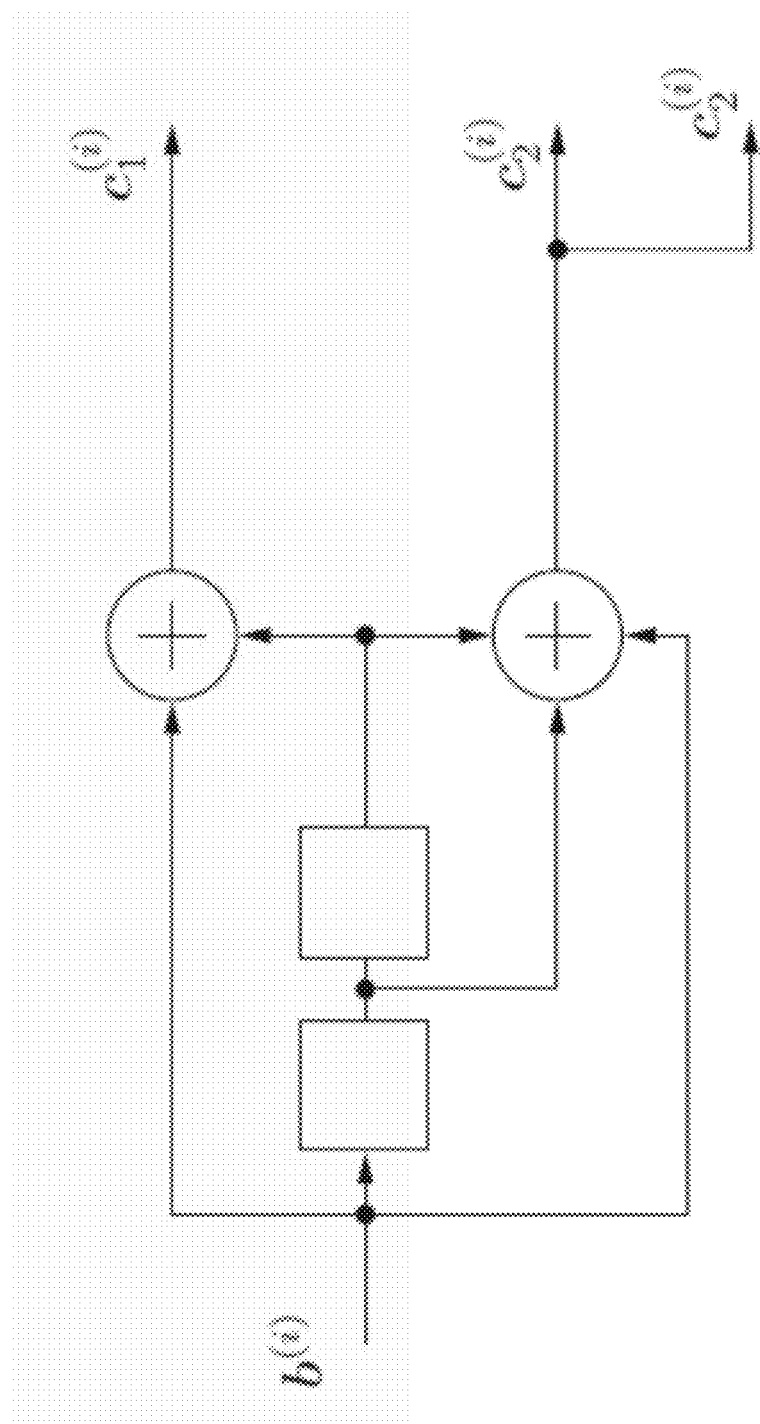
FIG. 8: Encoder of the joint network channel coding for communication device i when $\alpha=0$ and $\beta=1$.
Figure 9:
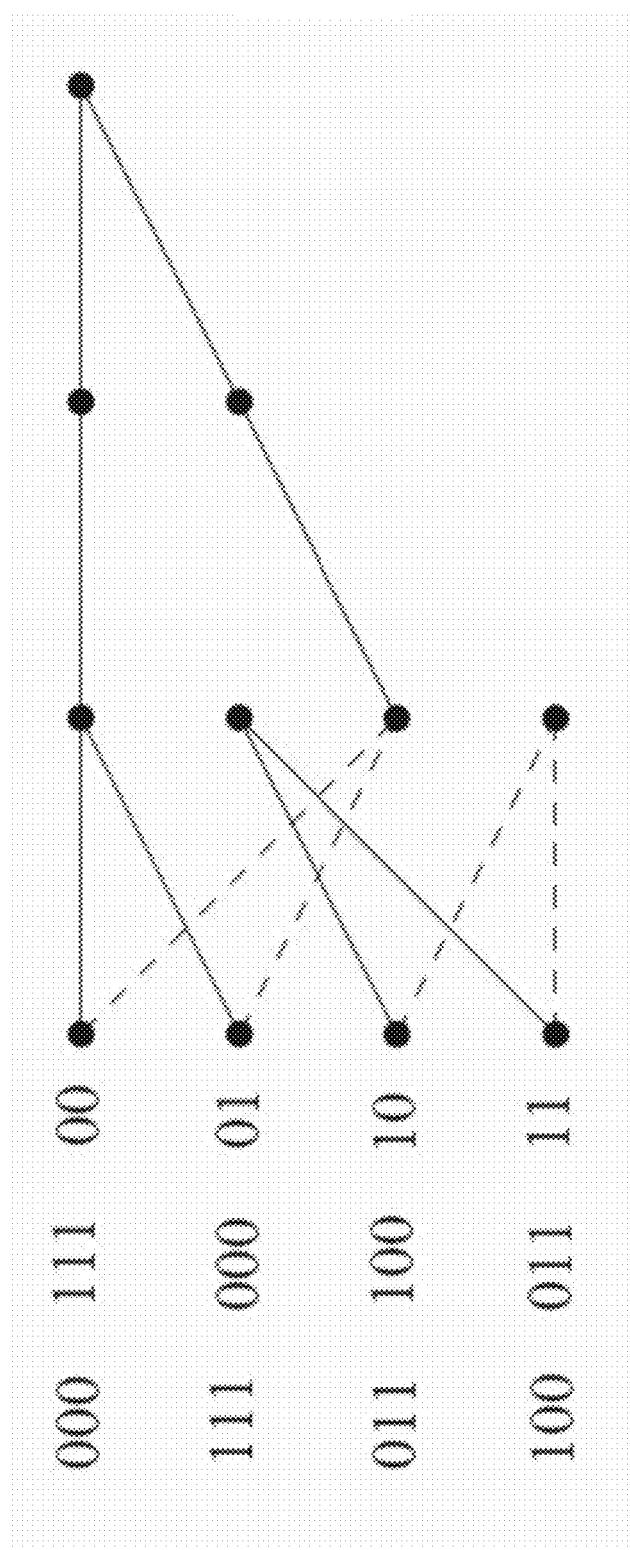
FIG. 9: Trellis diagram of the joint network channel coding for communication device i when $\alpha=0$ and $\beta=1$.

Employing the network coding according to embodiments herein at the first relay node 13, the overall operation in the MARC scheme for the first communication device 10, respectively the second communication device 11, can be seen as a rate ⅓ 4 state convolutional code with the encoder shown in FIG. 6 for the case when $\alpha=1$ and $\beta=1$. Convolutional codes are well known channel codes used to protect radio signal from the radio channel. The encoder in FIG. 6 shows how the redundancy of the channel encoder are generated at the receiver side. The corresponding trellis diagram is illustrated in FIG. 7. It is observed that the minimum Hamming distance of this overall encoder is given by $$d_{min}=w(000,110)+w(000,011)+w(000,110)=2+2+2=6. \quad (3)$$

which is better than the minimum Hamming distance of the original user encoder. This represents an asymptotic coding gain of 0.79 dB as compared the direct link, non-cooperative case, over an ideal Additive White Gaussian Noise (AWGN) channel. It is also important to mention that the total number of states of the joint network-channel coding is unchanged and is equal to 4. Hence, the proposed network coding scheme introduces a diversity gain from the relay node link without increasing the complexity of the decoding process at the receiver. It is quite clear that the combining parameters $\{\alpha,\beta\}$ allow us to optimize the combined network-channel coding scheme. In fact, with a proper selection of the combining coefficients of the network coding used at the relay node it is possible to optimize the overall joint channel network coding scheme. For instance by selecting $\alpha=0$ and $\beta=1$, the overall channel network coding scheme becomes an optimum ⅓ 4 state convolutional code with the trellis diagram shown in FIG. 8 and the trellis diagram shown in FIG. 9 [Pro01]. This scheme is referred to as the optimum NC scheme. The minimum Hamming distance of this obtained convolutional code is given by $$d_{min}=w(000,111)+w(000,011)+w(000,111)=3+2+3=8. \quad (4)$$

which is bigger than that obtained with $\alpha=1$, $\beta=1$. This represents an asymptotic coding gain of 2.04 dB as compared to the direct link alone over an ideal AWGN channel.

Hence, with this structure it is possible to optimize the combination of channel network coding without increasing the complexity of the decoder at the receiver side.

Decoding

The proposed network coding scheme used at the respective relay node 13,14 is an orthogonal scheme in a time division manner. Each communication device 10,11 forms its network coded sequence independently from the other. If, for instance, communication device i is employing a convolutional code with rate $k_i/n_i$, i=1, 2. For each time slot, three modulated sequences are received at the radio access node 12 for each communication device, two directly from the communication device and one from the relay node 13. For the user network coding there is no correlation between the sequence from the first communication device 10 and that received from the second communication device 11. Hence, to decode the information of communication device i, the radio access node 12 ignores the other communication device sequence and considers the received sequence of communication device i and the corresponding sequence received from the ith relay node 13. As mentioned earlier, by considering the two received coded words together one can see the combined convolutional code and network coding for the communication device i as a new convolutional code with a rate $2k_i/(3n_i)$. Hence, a Viterbi algorithm based on the optimum maximum likelihood sequence estimation can be used to decode the information of the two communication devices separately. Denoting by $r_i$, i=1, 2 the received coded word from communication device i and by $r_3$ the received coded word from the relay node. We have $$r_i=[r_{i,0}, r_{i,1}, \ldots, r_i,n_i], i=1,2 \quad (5)$$

$$r_3=[r_{3,0}, r_{3,1}, \ldots, r_{3,max\{n1,n2\}}] \quad (6)$$

For a flat fading multi-path channel, the received samples can be written as follows:

$$r_{i,k}=h_i s_{i,k}+z_{i,k}, i=1,2,3 \quad (7)$$

where $s_{i,k}$ is the modulated symbol of the coded bit $c_{i,k}$. For a Binary Phase Shift Keying (BPSK) modulation we have $s_{i,k}=2c_{i,k}-1$.

The optimum Viterbi algorithm decodes the information of each communication device independently from the other. In that, two parallel Viterbi decoders may be employed, one to decode information of the first communication device 10 and one to decode the information of the second communication device 11. Each decoder will base its path metric distance calculations using the following branch metric:

$$\mathcal{M}(s_1, \hat{s}_1) = \sum_{k=0}^{n_1} |r_{1,k} - h_{1,k}\hat{s}_{1,k}|^2 + \sum_{k=0}^{\lfloor n_1/2 \rfloor} |r_{3,k} - h_{3,k}\hat{s}_{3,k}|^2 \quad (8)$$

for user 1 and $$\mathcal{M}(s_2, \hat{s}_2) = \sum_{k=0}^{n_2} |r_{2,k} - h_{2,k}\hat{s}_{2,k}|^2 + \sum_{k=\lfloor n_1/2 \rfloor+1}^{max\{n_1,n_2\}} |r_{3,k} - h_{3,k}\hat{s}_{3,k}|^2 \quad (9)$$

for user 2.

To exemplify the proposed method, let us assume that the channel encoder at the first communication device 10 is a convolutional encoder of constraint length K=3 as depicted in FIG. 2a. At the first Relay Node 13 the demodulated sequences, $\{c_j^{(1)}, c_j^{(2)}\}$, are network coded. In case of simple addition the Network Coding (NC) operation will result in $c_j=c_j^{(1)}+c_j^{(2)}$ where j=1, 2. The equivalent or composite encoder is shown in FIG. 7 where the output of the encoder is formed by the coded words $c^{(1)}$, $c^{(2)}$ and c the outputs of the encoders at the first and second communication devices, and at the first relay node 13. A rate of the equivalent convolutional encoder, $R_e$, for communication device i is $$R_e = \frac{2k}{3n} = \frac{1}{3}$$

and the total number of states is $v=v_i=4$. Finally, the decoder at the radio access node 12 will simply apply the Viterbi algorithm on the equivalent trellis shown in FIG. 8. The trellis diagram for the equivalent encoder of the MARC scheme with the network coding comprises 4 states for each communication device whereas the trellis diagram of the equivalent encoder of conventional XOR-based network coding comprises $v_1 \times v_2=16$ states [BSO12]. The above description shows that the proposed user network coding scheme gives an equivalent convolutional encoder having the same number of states as the individual convolutional encoder of the cooperating users but with a better free Hamming distance. The effect of having the same number of states is that the decoder will have the same complexity as the decoder when no cooperation is employed. The better free Hamming distance means a better performance, i.e. lower transmitted power, as compared to the non-cooperative case, for the same quality of service.

Performance

Figure 10:
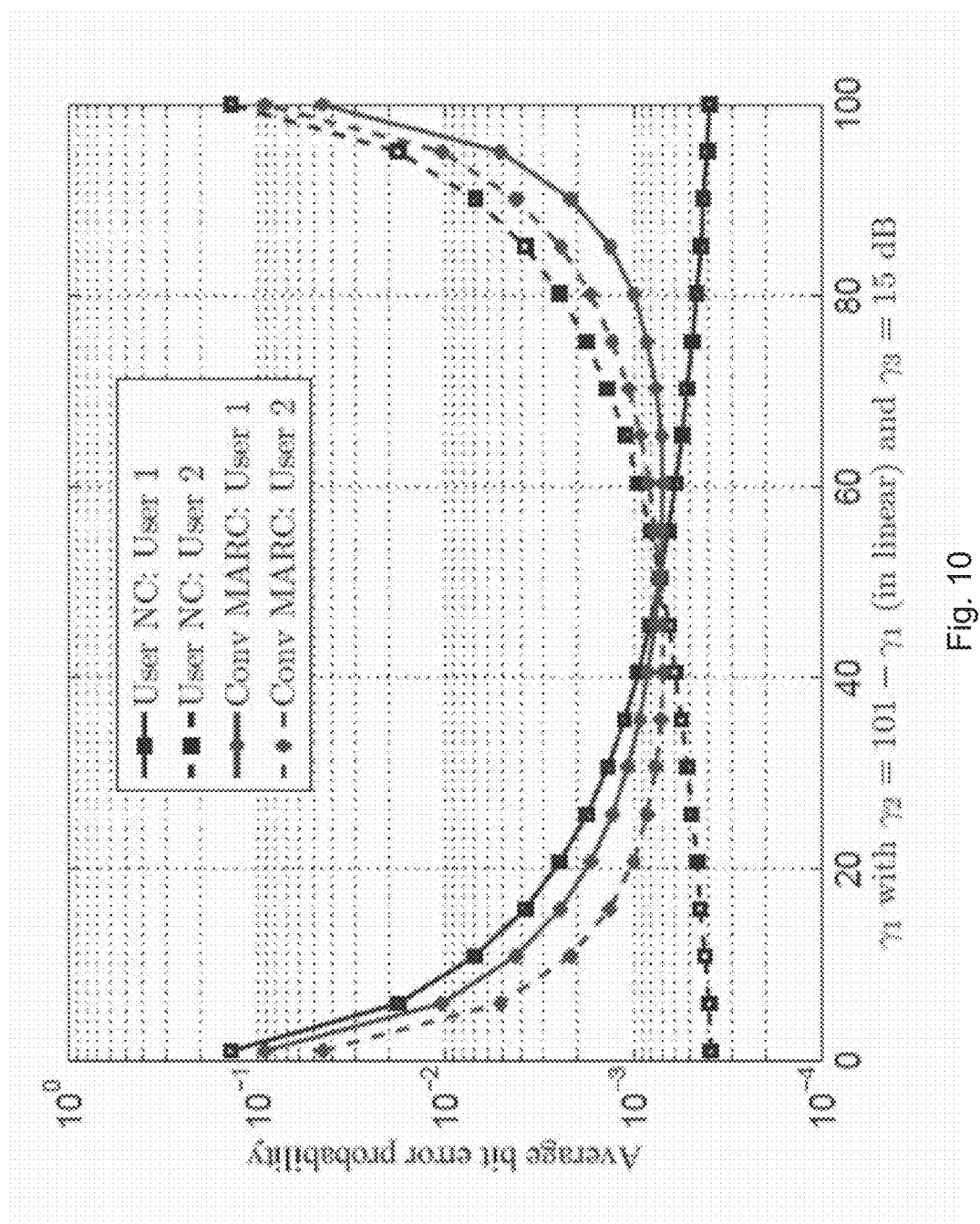
FIG. 10: Performance of the MARC scheme with network coding over Rayleigh fading channels for both conventional and the new proposed user network coding as a function of $\gamma_1$ when $\gamma_2=101-\gamma_1$. The Relay-Base station SNR is $\gamma_3=15$ dB and both users employing coherent 4 QAM.

To illustrate the performance of the proposed scheme we have looked at the uncoded average Bit Error Rate (BER) over AWGN channels and for different values of Signal-to-Noise Ratios (SNRs) when coherent BPSK modulation is employed by both cooperating users. FIG. 10 illustrates the average BER, defined along a vertical axis, of the communication devices as a function of the average SNR, defined along horizontal axis, of the first communication device $$10\gamma_1 = \frac{E_1}{N_0} \text{ when } \frac{E_2}{N_0} = 101 - \frac{E_1}{N_0} \text{ and } \frac{E_3}{N_0} = 15 \text{ dB}.$$

Here $$\frac{E_1}{N_0} + \frac{E_2}{N_0} = Cste = 101(\sim 20 \text{ dB}).$$

Figure 11:
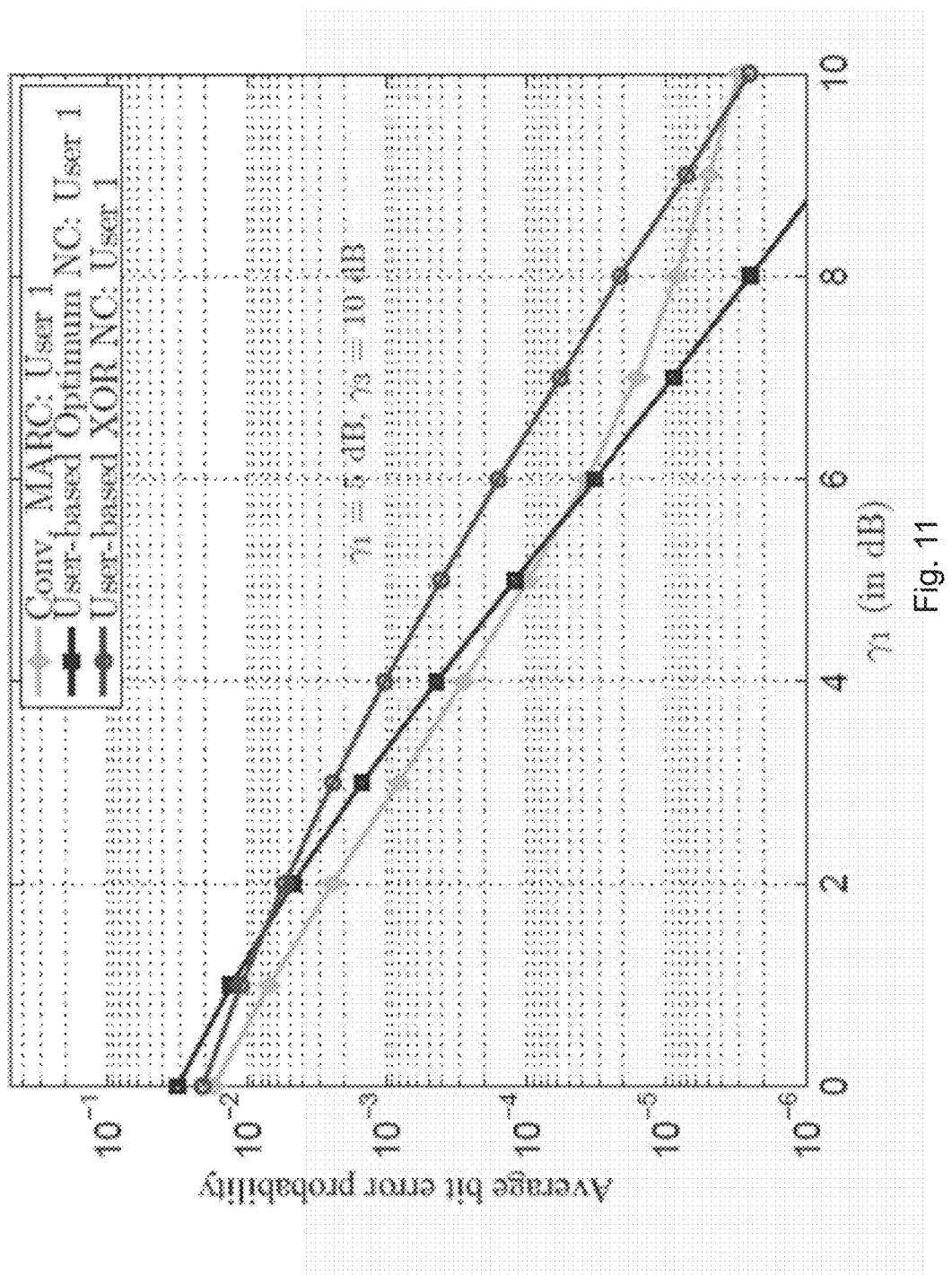
FIG. 11: Performance of the MARC scheme with the proposed user network coding scheme for user 1 over Rayleigh fading channels when the user convolutional code is rate ½ 4 state code. The three links have different average received SNRs with $\gamma_1=5$ dB and $\gamma_3=10$ dB.

It is observed from the FIG. 10 that the proposed network coding allows the communication device with good direct link quality to have good performance and it is not affected by the weak communication device. However, for the conventional MARC scheme, when one of the communication devices has a bad direct link quality both communication devices will suffer and experience bad BER values. Performance of the first communication device 10 (User 1) are shown with full lines, square marked for NC and dot marked for conventional MARC. Performance of the second communication device 11 (User 2) are shown with dashed lines, square marked for NC and dot marked for conventional MARC. This shows that the proposed network coding scheme breaks the dependency between the two cooperating communication devices and provides a flexibility in allocating resources to the cooperating communication devices at the relay node such as the first relay node 13 or the second relay node 14. It provides more flexibility in user grouping within the cooperation process. For instance, more slots can be allocated to the weak communication device. Furthermore, the cooperating communication devices have no restriction and can use different modulation levels and different channel coding schemes. This flexibility is not that straightforward in the conventional MARC scheme. FIG. 11 illustrates the average bit error probability, defined along a vertical axis, of the MARC scheme with the network coding over Rayleigh fading channels when convolutional codes are employed by the individual communication devices. Also included in the figure is the BER of the MARC scheme with conventional XOR-based network coding with the sub-optimum decoder of [BSO12], marked with circles. Here the SNR of the second communication device 11 is fixed to $\gamma_2 = 5$ dB and the SNR of the relay link to $\Gamma_3 = 10$ dB and obtained the average BER of the first communication device 10 as a function of the received SNR of the first communication device 10, $\gamma_1$. It is observed that the optimum user network coding, line marked with squares, provides very good performance and is not affected by the quality of the direct link of the second communication device 11. However, the performance of the conventional MARC scheme, marked with diamonds, is dependent on the quality of the direct link of the second communication device 11 and the BER experiences an error floor.

Practical Implementation

Figure 12:
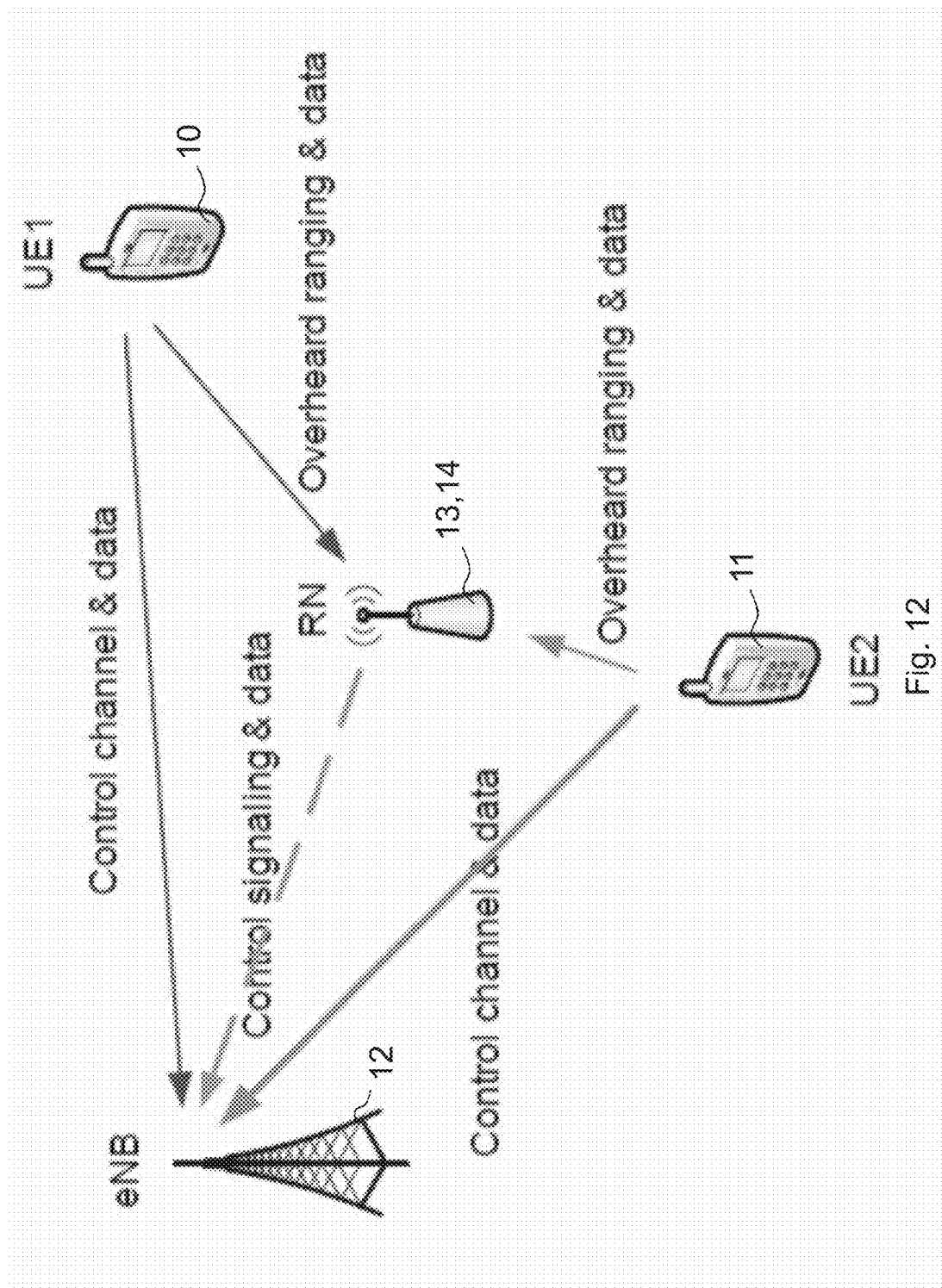
FIG. 12: Operations of the proposed user network coding scheme in a multiple access relay channel.
Figure 13:
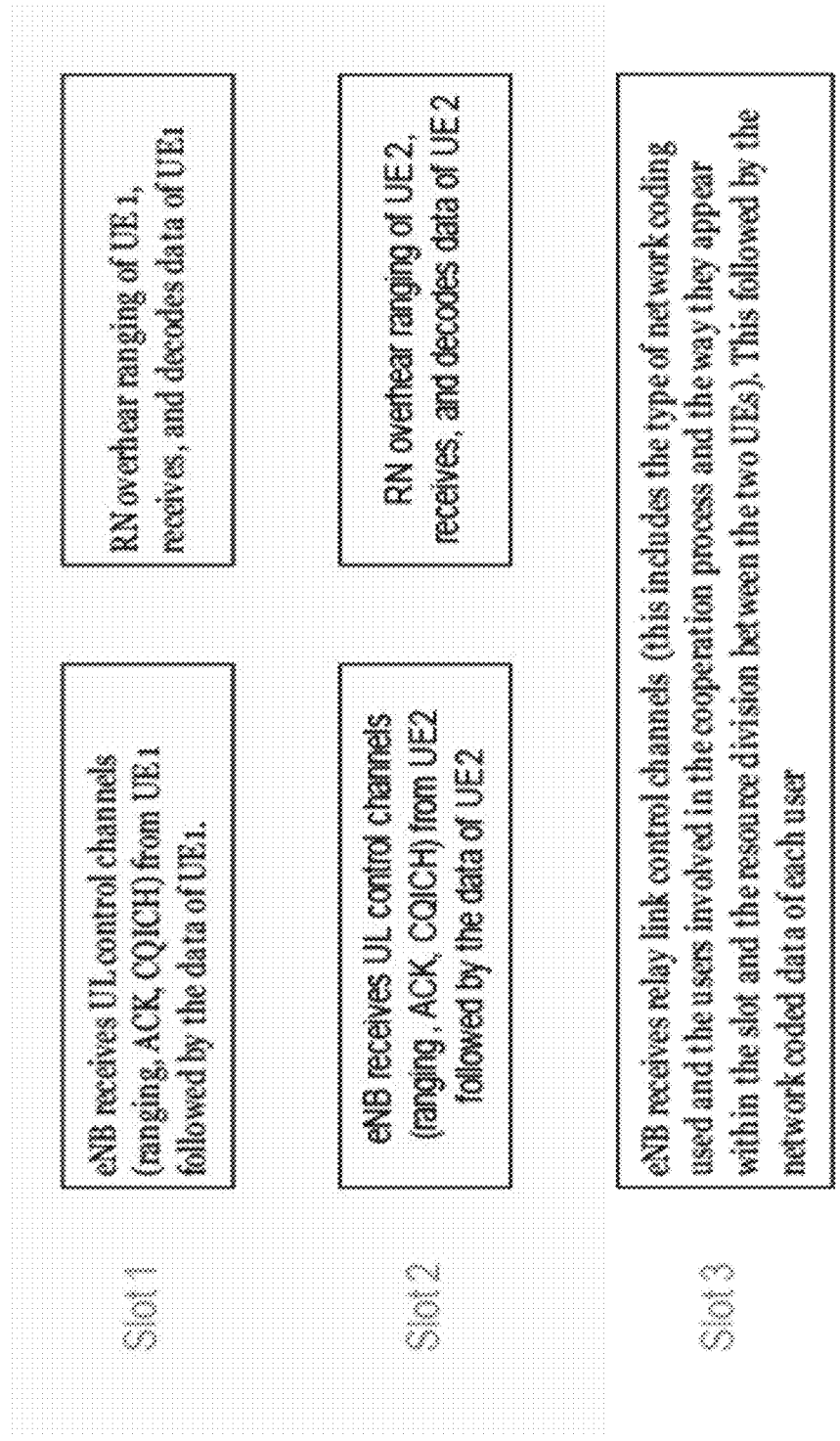
FIG. 13: Transmission flowchart.

The proposed idea according to embodiments herein may easily be implemented in LTE and 5G systems. The idea may assume that the system supports fixed relays. This is the case of LTE-Advanced, where in-band fixed relays are part of the standard, and most probably 5G. According to embodiments herein the respective relay node 13,14 knows the type of network coding to be used. Hence, a dedicated downlink control channel may be used to inform the respective relay node that network coding is to be used as illustrated in FIG. 12. As the user network coding can be different for different channel codes, the respective relay node needs to be informed about the type of user network coding. The scheme can be easily detected in the system by simply listening to the control channel from the cooperating relay node. Cooperation within this proposed method can be done via two different relay nodes, the first relay node 13 and the second relay node 14, the dedicated control channel should inform the involved relay nodes so that synchronization between them can be ensured. As indicated in FIG. 12, the communication between the cooperating communication devices, i.e. the first communication device 10 and the second communication device 11, the respective relay node 13,14, and the radio access node 12 is done in three steps, e.g. using orthogonal slots. The transmission/reception within the first two slots do not require any changes and is transparent to the communication devices. However, the third slot includes an additional control signal dedicated to the network coding type proposed. These transmission steps are illustrated in FIG. 13. Slot 1: eNB or radio access node 12 receives UL control channels (ranging, Acknowledgement (ACK), Channel Quality Information Channel (CQ-ICH)) from the first communication device 10 (UE1) followed by the data of the first communication device 10; the relay node 13,14 overhears ranging of the first communication device 10, and receives and decodes data of the first communication device 10. Slot 2: eNB or radio access node 12 receives UL control channels (ranging, Acknowledgement (ACK), Channel Quality Information Channel (CQ-ICH)) from the second communication device 11 (UE2) followed by the data of the second communication device 11; the relay node 13,14 overhears ranging of the second communication device 11, and receives and decodes data of the second communication device 11. Slot 3: the radio access node 12 (eNB) receives relay link control channels (this includes the type of network coding used and the communication devices (users) involved in the cooperation process and the way they appear within the third slot and the resource division between the communication devices. This is followed by the network coded data of each communication device (user).

Advantages of Embodiments Herein

As the network coded first user data stream and the network coded second user data stream are forwarded in an orthogonal manner relative one another, and thereby separated, it will be easy to separate communication devices at the radio access node 12, e.g. at a base station receiver.

Flexibility of cooperating communication devices. No restriction on modulation, channel coding. Each communication device can employ any modulation and channel coding scheme independently from the other communication device.

Combination of this cooperating scheme with channel coding can be optimized and provides much better performance that conventional XOR-based network coding along communication devices.

The complexity of the channel decoder is not affected because the communication devices are separable and single communication device detection is used without any effects on the diversity gain.

The cooperating communication devices do not need to cooperate via one single relay node. Since the cooperating communication devices are decoupled, each communication device can select its best relay node within the cell. With this flexibility, the throughput of each communication device can be maximized which improves the cell throughput. And the communication devices do not need to be close to the same relay node to be able to cooperate.

Possibility to use the space in a more efficient way by properly selecting the modulation constellation set at a transmitter(s) and the relay node for each communication device. Here, each communication device can take advantage of the diversity gain as well as from the augmented signal space formed by its direct and the relay node link.

ABBREVIATIONS

AF: Amplify and Forward
BS: Base Station
DAS: Distributed Antenna System
DF: Decode and Forward
JNCC Joint Network Channel Coding
LDPC: Low Density Parity Check
MARC: Multiple Access Relay Channel
MIMO: Multiple Input Multiple Output
ML: Maximum Likelihood
MRC: Maximum Ratio Combining
NC: Network Coding
QoS: Quality of Service
RN: Relay Node
SISO: Single Input Single Output
SINR: Signal to Interference and Noise Ratio
SNCC Joint Network Channel Coding
UE: User Equipment
VA: Viterbi Algorithm

REFERENCES

[AB10] T. R. Ahsin and S. Ben Slimane. Detection strategies in cooperative relaying with network coding. In Personal Indoor and Mobile Radio Communications (PIMRC), 2010 IEEE 21st International Symposium on, pages 12-17, 2010.

[ACLY00] R. Ahlswede, N. Cai, S.-Y. R. Li, and R. W. Yeung. Network information flow. IEEE Trans. Information Theory, IT-46(4):1204-1216, July 2000.

[BSO12] S. Ben Slimane and A. Osseiran. Joint processing in cooperative radio communication networks. Wo patent 2,012,158,082, November 2012.

[CHZK09] L. Chebli, C. Hausl, G. Zeitler, and R. Koetter. Cooperative Uplink of Two Mobile Stations with Network Coding Based on the WiMax LDPC Code. In Global Telecommunications Conference, 2009. GLOBECOM 2009. IEEE, 2009.

[CKL06] Y. Chen, S. Kishore, and J. T. Li. Wireless diversity through network coding. IEEE WCNC Proceedings, 2006.

[Hau08] Christoph Hausl. Joint Network-Channel Coding for Wireless Relay Networks. Dissertation, Technische Universita at Munchen, Munchen, 2008.

[HD06] C. Hausl and P. Dupraz. Joint Network-Channel Coding for the Multiple-Access Relay Channel. In Sensor and Ad Hoc Communications and Networks, 2006. SECON '06. 2006 3rd Annual IEEE Communications Society on, volume 3, pages 817-822, 2006.

[HKM+03] T. Ho, R. Koetter, M. M edard, D. R. Karger, and M. Effros. The benefits of coding over routing in a randomized setting. In IEEE Proc. Int'l Symp. Information Theory, Yokohama, Japan, June 2003.

[HSO05] C. Hausl, F. Schreckenbach, and I. Oikonomidis. Iterative network and channel decoding on a tanner graph. 43rd Annual Allerton Conference on Communication, Control, and Computing, Monticello, USA, 2005.

[LYC03] S.-Y. R. Li, R. W. Yeung, and N. Cai. Linear network coding. IEEE Trans. Information Theory, IT-49 (2):371-381, February 2003.

[Pro01] G. John Proakis. Digital Communications. McGraw-Hill, 2001.

[TC10] Duc To and Jinho Choi. Convolutional Codes in Two-Way Relay Networks with Physical-Layer Network Coding. Wireless Communications, IEEE Transactions on, 9(9):2724-2729, 2010.

[WCK05] Y. Wu, P. A. Chou, and S.-Y. Kung. Information exchange in wireless networks with network coding and physical-layer broadcast. In 39th Annual Conference on Information Sciences and Systems (CISS), Baltimore, Md., March 2005.

[WK07] D. H. Woldegebreak and H. Karl. Multiple-access relay channel with network coding and non-ideal source-relay channels. In ISWCS 2007, pages 732-736, October 2007.

Figure 14:
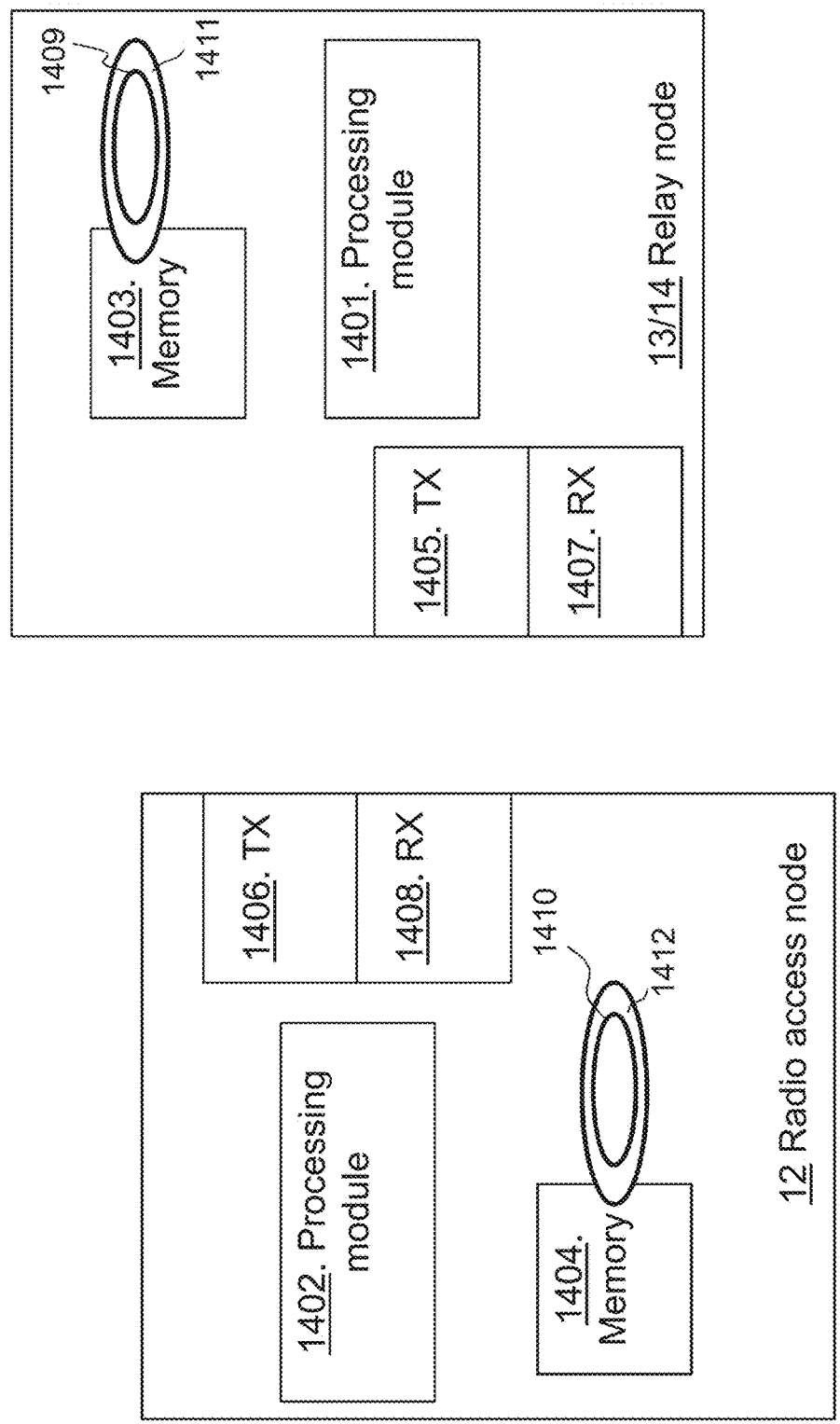
FIG. 14: Block diagram depicting the radio access node and the relay node according to embodiments herein.

The embodiments herein for relaying the user data may be implemented through one or more processors or processing modules 1401,1402 in the relay node 13/14 or radio access node 12 depicted in FIG. 14, together with computer program code for performing the functions and/or method actions of the embodiments herein. The program code mentioned above may also be provided as a computer program product, for instance in the form of a data carrier carrying computer program code for performing embodiments herein when being loaded into the relay node 13/14 and/or radio access node 12. One such carrier may be in the form of a CD ROM disc. It is however feasible with other data carriers such as a memory stick. The computer program code may furthermore be provided as pure program code on a server and downloaded to the relay node 13/14 and/or radio access node 12.

The relay node 13/14 and/or the radio access node 12 further comprises a memory 1403,1404. The memory comprises one or more units to be used to store data on, such as network coding, applications to perform the methods disclosed herein when being executed, and similar. The relay node 13/14 and/or the radio access node 12 further comprises a respective transmitter (TX) 1405,1406 and a respective receiver (RX) 1407,1408. These may be implemented as transceivers.

Thus, embodiments herein provide a computer program 1409,1410, comprising instructions which, when executed on at least one processor, cause the at least one processor to carry out the methods according the embodiments herein. Furthermore, embodiments herein provide a computer-readable storage medium 1411, 1412, having stored thereon the computer program 1409,1410, comprising instructions which, when executed on at least one processor, cause the at least one processor to carry out the methods according the embodiments herein.

Figure 15:
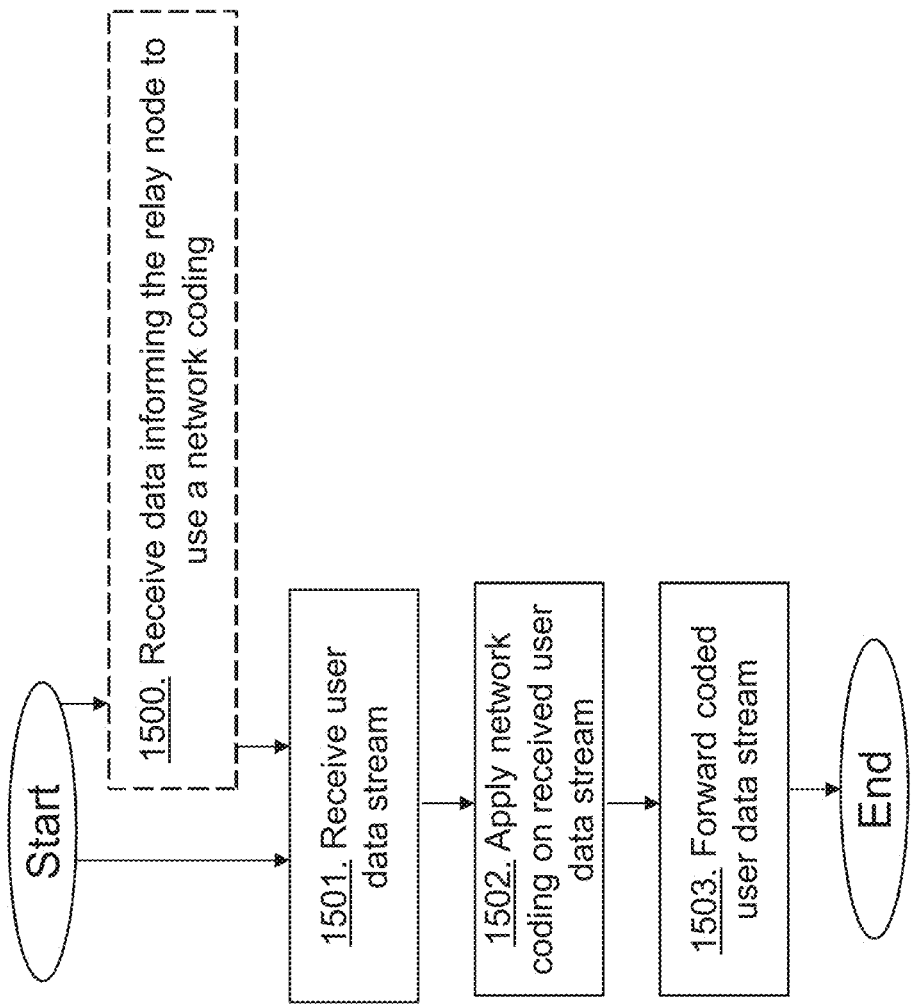
FIG. 15 shows a flowchart of a method in a relay node according to embodiments herein.

The method actions in the relay node, referred to as the first relay node 13 or the second relay node 14 in the figures, for relaying user data from/to one or more communication devices 10,11 to/from the radio access node 12 in the wireless communication network 1 according to some embodiments will now be described with reference to a flowchart depicted in FIG. 15. The actions do not have to be taken in the order stated below, but may be taken in any suitable order. Actions performed in some embodiments are marked with dashed boxes.

Action 1500. The relay node may receive data, over a dedicated downlink control channel from the radio access node 12, informing the relay node to use the network coding and/or type of the network coding.

Action 1501. The relay node 13,14 receives a first user data stream and/or a second user data stream from a first communication device 10 and a second communication device 11 respectively, or from the radio access node 12. The first user data stream is comprised in a first time slot and/or the second user data stream is comprised in a second time slot.

Action 1502. The relay node 13,14 applies a network coding on the received first user data stream, independently of the second user data stream, into a network coded first user data stream. Additionally or alternatively, the relay node 13,14 applies a network coding on the received second user data stream, independently of the first user data stream, into a network coded second user data stream. The network coding applied may be based on a channel coding used on the first user data stream and/or the second user data stream.

Action 1503. The relay node 13,14 forwards the network coded first user data stream in a third time slot to the radio access node 12 or the first communication device 10. Additionally or alternatively, the relay node 13,14 may forward the network coded second user data stream in the third time slot to the radio access node 12 or the second communication device 11. The network coded first user data stream and network coded second user data stream are forwarded in an orthogonal manner relative one another in the third time slot. In some embodiments the relay node applies the network coding by coding the received first user data stream into a first part of the third time slot and/or the received second user data stream into a different part of the third time slot, separated in time from one another.

Figure 16:
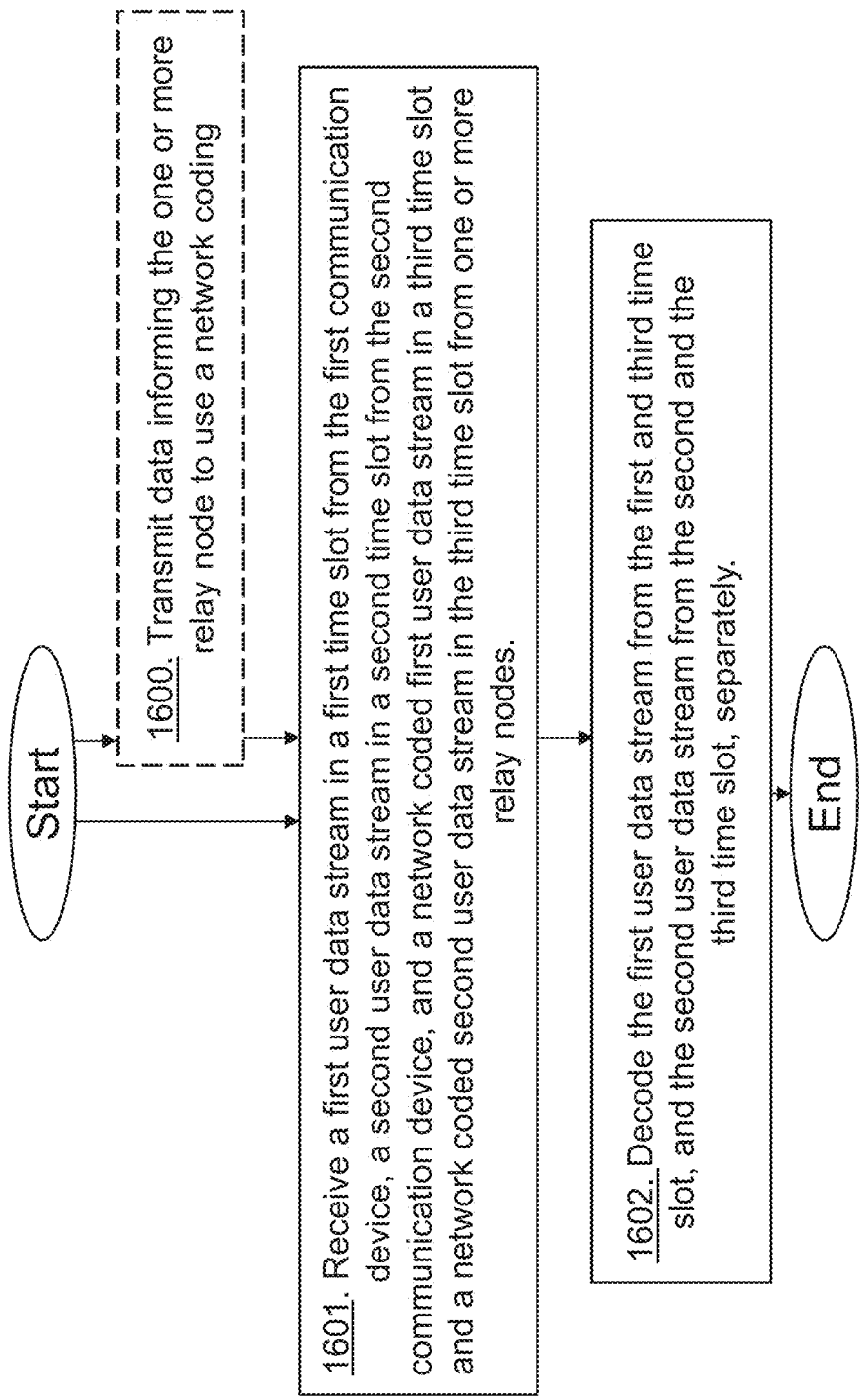
FIG. 16 shows a flowchart of a method in a radio access node according to embodiments herein.

The method actions in the radio access node 12 for decoding user data from the first communication device 10 and the second communication device 11 in a wireless communication network 1 according to some embodiments will now be described with reference to a flowchart depicted in FIG. 16. The actions do not have to be taken in the order stated below, but may be taken in any suitable order. Actions performed in some embodiments are marked with dashed boxes.

Action 1600. The radio access node 12 may transmit data, over a dedicated downlink control channel, informing the one or more relay node to use a network coding on the first and/or second user data streams and/or type of the network coding.

Action 1601. The radio access node 12 receives a first user data stream in a first time slot from the first communication device 10, a second user data stream in a second time slot from the second communication device 11, and a network coded first user data stream in a third time slot and a network coded second user data stream in the third time slot from one or more relay nodes. The network coded first user data stream and the network coded second user data stream are orthogonal relative one another. The network coding may be based on a channel coding used by the first communication device 10 and/or the second communication device 11.

Action 1602. The radio access node 12 decodes the first user data stream from the first and third time slot, and the second user data stream from the second and the third time slot, separately. The network coded first user data stream and the network coded second user data stream may be orthogonal relative one another in the third time slot, and the radio access node may decode the first user data stream from a first part of the third time slot and the second user data stream from a different part of the third time slot, which first part and different part are separated from one another in time.

The radio access node 12 may decode the first user data stream and the second user data stream in parallel in separate decoders.

In order to perform the methods herein a relay node such as the first relay node 13 or the second relay node 14 and a radio access node are provided.

Figure 17:
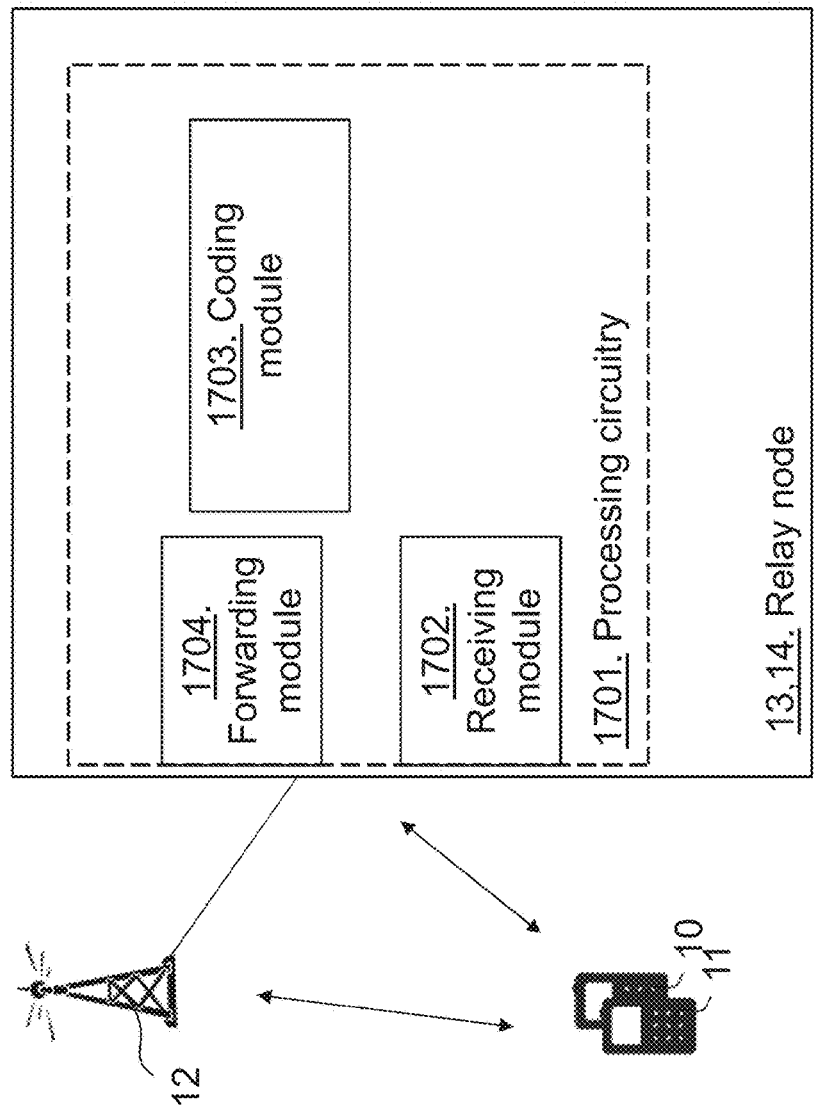
FIG. 17 shows a block diagram depicting a relay node according to embodiments herein.

FIG. 17 shows a block diagram depicting the relay node 13,14 for relaying user data from/to one or more communication devices, e.g. the first and second communication devices, to/from the radio access node 12 in the wireless communication network 1.

The relay node 13,14 is configured to receive a first user data stream and/or a second user data stream from the first communication device 10 and the second communication device 11 respectively, or from the radio access node 12. The first user data stream is comprised in a first time slot and/or the second user data stream is comprised in a second time slot.

The relay node 13,14 is further configured to apply a network coding on the received first user data stream, independently of the second user data stream, into a network coded first user data stream, and/or the received second user data stream, independently of the first user data stream, into a network coded second user data stream. The relay node 13,14 may be configured to apply the network coding by coding the received first user data stream into a first part of the third time slot and/or the received second user data stream into a different part of the third time slot, separated in time from one another. The network coding applied may be based on a channel coding used on the first user data stream and/or the second user data stream.

The relay node 13,14 is additionally configured to forward the network coded first user data stream in the third time slot to the radio access node 12 or the first communication device 10, and/or the second user data stream in the third time slot to the radio access node 12 or the second communication device 11. The network coded first user data stream and the network coded second user data stream are forwarded in an orthogonal manner relative one another.

The relay node 13,14 may be configured to receive data, over a dedicated downlink control channel from the radio access node 12, informing the relay node 13 to use the network coding and/or type of the network coding.

The relay node 13,14 may comprise processing circuitry 1701 to perform the methods herein.

The relay node 13,14 may comprise a receiving module 1702. The processing circuitry 1701 and/or the receiving module 1702 may be configured to receive a first user data stream and/or a second user data stream from the first communication device 10 and the second communication device 11 respectively, or from the radio access node 12. The first user data stream is comprised in a first time slot and/or the second user data stream is comprised in a second time slot. The processing circuitry 1701 and/or the receiving module 1702 may further be configured to receive data, over a dedicated downlink control channel from the radio access node 12, informing the relay node 13,14 to use the network coding and/or type of the network coding.

The relay node 13,14 may additionally comprise a coding module 1703. The processing circuitry 1701 and/or the coding module 1703 may be configured to apply a network coding on the received first user data stream, independently of the second user data stream, into a network coded first user data stream, and/or the received second user data stream, independently of the first user data stream, into a network coded second user data stream. The processing circuitry 1701 and/or the coding module 1703 may be configured to apply the network coding by coding the received first user data stream into a first part of the third time slot and/or the received second user data stream into a different part of the third time slot, separated in time from one another. The network coding applied may be based on a channel coding used on the first user data stream and/or the second user data stream.

The relay node 13,14 may further comprise a forwarding module 1704. The processing circuitry 1701 and/or the forwarding module 1704 may be configured to forward the network coded first user data stream in the third time slot to the radio access node 12 or the first communication device 10, and/or the second user data stream in the third time slot to the radio access node 12 or the second communication device 11. The network coded first user data stream and the network coded second user data stream are forwarded in an orthogonal manner relative one another.

Figure 18:
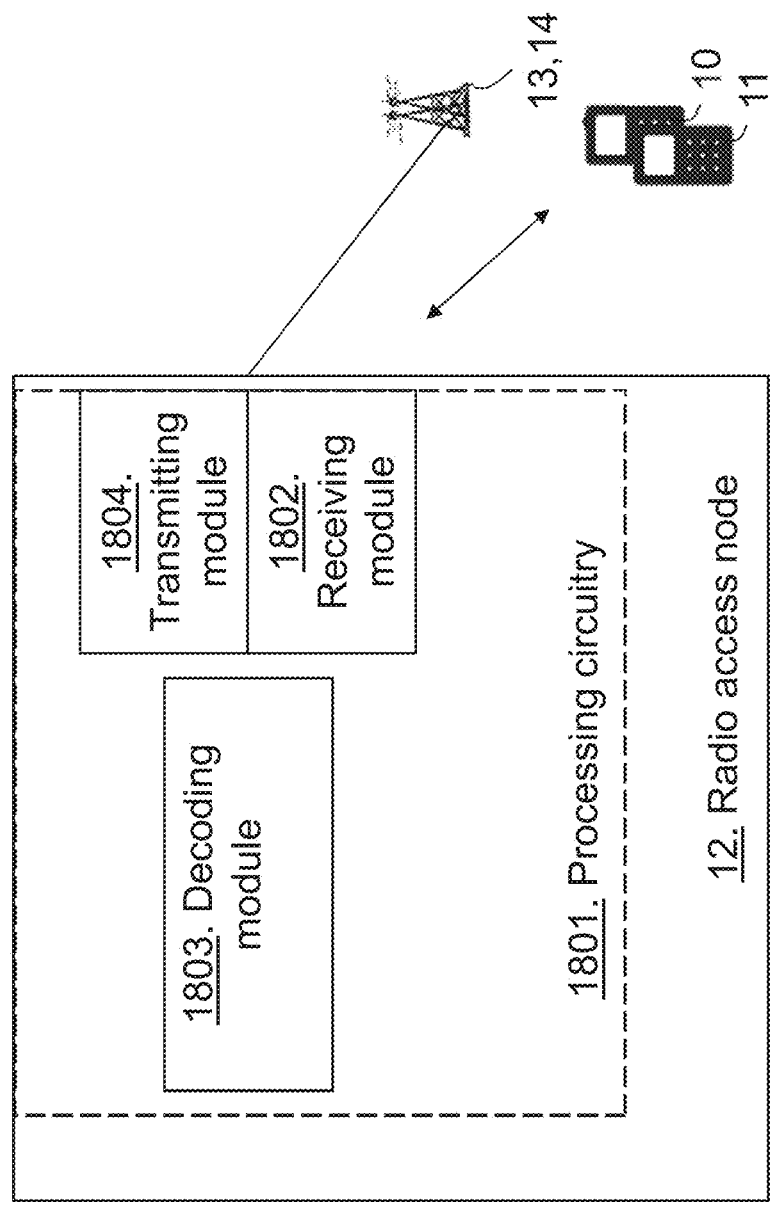
FIG. 18 shows a block diagram depicting a radio access node according to embodiments herein.

FIG. 18 is a block diagram depicting the radio access node 12 for decoding user data from the first communication device 10 and the second communication device 11 in the wireless communication network 1.

The radio access node 12 is configured to receive a first user data stream in a first time slot from the first communication device 10, a second user data stream in a second time slot from the second communication device 11, and, from one or more relay nodes, e.g. the relay node 13 and the second relay node 14, a network coded first user data stream in a third time slot and a network coded second user data stream in the third time slot. The network coded first user data stream and the network coded second user data stream are orthogonal relative one another. The network coding may be based on a channel coding used by the first communication device 10 and/or the second communication device 11.

The radio access node 12 is further configured to decode the first user data stream from the first and the third time slot, and the second user data stream from the second and the third time slot, separately. The network coded first user data stream and the network coded second user data stream may be orthogonal relative one another in the third time slot, and the radio access node 12 may further be configured to decode the first user data stream from a first part of the third time slot and the second user data stream from a different part of the third time slot. The first part and different part are separated from one another in time. The radio access node 12 may further be configured to decode the first user data stream and the second user data stream in parallel in separate decoders.

The radio access node 12 may further be configured to transmit data, over a dedicated downlink control channel, informing the one or more relay nodes to use a network coding on the first and/or second user data streams and/or type of the network coding.

The radio access node 12 may comprise processing circuitry 1801 to perform the methods herein.

The radio access node may comprise a receiving module 1802. The processing circuitry 1801 and/or the receiving module 1802 may be configured to receive a first user data stream in a first time slot from the first communication device 10, a second user data stream in a second time slot from the second communication device 11, and, from one or more relay nodes, e.g. the relay node 13 and the second relay node 14, a network coded first user data stream in a third time slot and a network coded second user data stream in the third time slot. The network coded first user data stream and the network coded second user data stream are orthogonal relative one another. The network coding may be based on a channel coding used by the first communication device 10 and/or the second communication device 11.

The radio access node 12 may further comprise a decoding module 1803. The processing circuitry 1801 and/or the decoding module 1803 may be configured to decode the first user data stream from the first and the third time slot, and the second user data stream from the second and the third time slot, separately. The network coded first user data stream and the network coded second user data stream may be orthogonal relative one another in the third time slot, and the processing circuitry 1801 and/or the decoding module 1803 may further be configured to decode the first user data stream from a first part of the third time slot and the second user data stream from a different part of the third time slot. The first part and different part are separated from one another in time. The processing circuitry 1801 and/or the decoding module 1803 may further be configured to decode the first user data stream and the second user data stream in parallel in separate decoders.

The radio access node 12 may additionally comprise a transmitting module 1804. The processing circuitry 1801 and/or the transmitting module 1804 to transmit data, over a dedicated downlink control channel, informing the one or more relay nodes to use a network coding on the first and/or second user data streams and/or type of the network coding.

Embodiments herein provide a method performed by a relay node for relaying user data from/to communication devices to/from a radio access node in a wireless communication network. The relay node receives a first and/or a second user data stream from/to a first communication device and a second communication device respectively. The relay node applies network coding on the received first user data stream separately or independently of the second user data stream. The relay node may code the received first user data stream into a first part of a time slot and/or the received second user data stream into a different part of the time slot, separated from one another. The relay node then forwards the network coded first user data stream and/or the network coded second user data stream in the time slot to the radio access node. The network coded user data streams are transmitted in an orthogonal manner relative one another in the time slot. Since network coding is applied in an orthogonal manner at the relay node, it is possible to have two devices cooperating via e.g. two different relay nodes within the cell. This avoids the requirement for the cooperating devices to be near the same relay node in the existing solutions. This gives more flexibility and allow devices far away from each other to cooperate.

Furthermore, embodiments herein provide a method in a radio access node for decoding user data from a first communication device and a second communication device in a wireless communication network. The radio access node receives a first user data stream in a first time slot from the first communication device, a second user data stream in a second time slot from a second communication device, and the first network coded user data stream and the second network coded user data stream, separated from one another, in a third time slot from one or two relay nodes. The radio access node decodes the first user data stream from the first and third time slot and the second user data stream from the second and third time slot, separately. This reduces the complexity of the decoding process and allows a more efficient combination of network coding and convolutional coding. Thus, embodiments herein provide a mechanism that improves the performance in that the decoding at the radio access node is simplified and that in some embodiments the hamming distance is improved leading to a more correct decoding as more error may be corrected.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a communication device, a radio access node or a relay node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by one or more relay nodes for relaying user data from first and second communication devices to a radio access node in a wireless communication network, the method comprising:
   receiving configuration information from the radio access node, scheduling cooperating communication among the one or more relay nodes and the first and second communication devices for first, second, and third time slots;
   receiving a first user data stream from the first communication device in the first time slot;
   receiving a second user data stream from the second communication device in the second time slot;
   performing network coding independently on the received first and second user data streams, by combining consecutive symbols in the received first user data stream to obtain a network coded first user data stream, and, independently, combining consecutive symbols in the received second user data stream to obtain a network coded second user data stream;
   forwarding the network coded first user data stream in a first portion of the third time slot to the radio access node; and
   forwarding the network coded second user data stream in a different, second portion of the third time slot to the radio access node.

2. The method according to claim 1, further comprising receiving the configuration information over a dedicated downlink control channel from the radio access node.

3. The method according to claim 1, wherein the network coding performed for the received first user data stream is based on a channel coding used on the first user data stream, and wherein the network coding performed for the received second user data stream is based on a channel coding used on the second user data stream.

4. A method performed by a radio access node for decoding user data from a first communication device and a second communication device in a wireless communication network, comprising:
   sending configuration information from the radio access node, scheduling cooperating communication among one or more relay nodes and the first and second communication devices for first, second, and third time slots;
   receiving a first user data stream in the first time slot directly from the first communication device;
   receiving a second user data stream in a second time slot directly from the second communication device;
   receiving a network coded first user data stream in a first portion of the third time slot, as sent by one of the one or more relay nodes and formed by combining consecutive symbols in the first user data stream, the network coded first user data stream being independent of the second user data stream;
   receiving a network coded second user data stream in a different, second portion of the third time slot, as sent from one of the one or more relay nodes and formed by combining consecutive symbols in the second user data stream, the network coded second user data stream being independent of the first user data stream; and
   decoding the received first user data stream, as received in the first time slot, together with the received network coded first user data stream, as received in the first portion of the third time slot, and, separately, decoding the received second user data stream, as received in the second time slot, together with the received network coded user data stream, as received in the second portion of the third time slot.

5. The method according to claim 4, further comprising transmitting the configuration information over a dedicated downlink control channel to the one or more relay nodes.

6. The method according to claim 5, wherein the network coding used for the first user data stream is based on a channel coding used by the first communication device, and wherein the network coding used for the second user data stream is based on a channel coding used by the second communication device.

7. The method according to claim 4, wherein, based on using separate decoders, the decoding of the received first user data stream together with the received network coded first user data stream is performed in parallel with the decoding of the received second user data stream together with the received network coded second user data stream.

8. One or more relay nodes configured for relaying user data from first and second communication devices to a radio access node in a wireless communication network, the relay node comprising:
   transceiver circuitry; and
   processing circuitry configured to:
      receive, via the transceiver circuitry, configuration information from the radio access node, scheduling cooperating communication among the one or more relay nodes and the first and second communication devices for first, second, and third time slots;

receive, via the first transceiver circuitry, a first user data stream from the first communication device in the first time slot;

receive, via the transceiver circuitry, a second user data stream from the second communication device in the second time slot;

perform network coding independently on the received first and second user data streams, by combining consecutive symbols in the received first user data stream to obtain a network coded first user data stream, and, independently, combining consecutive symbols in the received second user data stream to obtain a network coded second user data stream; and forward the network coded first user data stream in a first portion of the third time slot to the radio access node; and forward the network coded second user data stream in a different, second portion of the third time slot to the radio access node.

9. The relay node according to claim 8, wherein the processing circuitry is configured to receive, via the transceiver circuitry, the configuration information over a dedicated downlink control channel from the radio access node.

10. The relay node according to claim 8, wherein the network coding performed for the received first user data stream is based on a channel coding used on the first user data stream and wherein the network coding performed for the received second user data stream is based on a channel coding used on the second user data stream.

11. A radio access node for decoding user data from a first communication device and a second communication device in a wireless communication network, the radio access node comprising:

transceiver circuitry; and processing circuitry configured to:

send, via the transceiver circuitry, configuration information from the radio access node, scheduling cooperating communication among one or more relay nodes and the first and second communication devices for first, second, and third time slots;

receive a first user data stream in the first time slot directly from the first communication device;

receive a second user data stream in the second time slot directly from the second communication device;

receive a network coded first user data stream in a first portion of the third time slot, as sent by one of the one or more relay nodes, the network coded first user data stream being independent of the second user data stream and formed by combining consecutive symbols in the first user data stream;

receive a network coded second user data stream in a different, second portion of the third time slot, as sent by one of the one or more relay nodes, the network coded second user data stream being independent of the first user data stream and formed by combining consecutive symbols in the second user data stream; and decode the received first user data stream, as received in the first time slot, together with the received network coded first user data stream, as received in the first portion of the third time slot, and, independently, decoded the received second user data stream, as received in the second time slot, together with the received network coded second user data stream, as received in the second portion of the third time slot.

12. The radio access node according to claim 11, wherein the processing circuitry is configured to send, via the transceiver circuitry, the configuration information over a dedicated downlink control channel to the one or more relay nodes.

13. The radio access node according to claim 12, wherein the network coding used for the first user data stream is based on a channel coding used by the first communication device, and wherein the network coding used for the second user data stream is based on a channel coding used by the second communication device.

14. The radio access node according to claim 11, wherein the processing circuitry includes or is associated with separate decoders, and wherein the processing circuitry is configured to decode the received first user data stream together with the received network coded first user data stream via one decoder and, separately but in parallel, decode the received second user data stream together with the received network coded second user data stream.

15. A non-transitory computer readable medium, or media, storing one or more computer programs comprising instructions that, when executed by processing circuitry of one or more relay nodes, configure the one or more relay nodes for relaying user data from first and second communication devices to a radio access node of a wireless communication network, said computer program instructions including program instructions to configure the one or more relay nodes to:

receive configuration information from the radio access node, scheduling cooperating communication among the one or more relay nodes and the first and second communication devices for first, second, and third time slots;

receive a first user data stream from the first communication device in the first time slot;

receive a second user data stream in the second time slot;

perform network coding independently on the received first and second user data streams, by combining consecutive symbols in the received first user data stream to obtain a network coded first user data stream, and, independently, combining consecutive symbols in the received second user data stream to obtain a network coded second user data stream; and forward the network coded first user data stream to the radio access node in a first portion of the third time slot, and forward the network coded second user data stream to the radio access node in a different, second portion of the third time slot.

16. A non-transitory computer readable medium storing a computer program comprising program instructions that, when executed by processing circuitry at a radio access node in a wireless communication network, configure the radio access node for decoding user data from a first communication device and a second communication device, said computer program comprising program instructions configuring the radio access node to:

send configuration information from the radio access node, scheduling cooperating communication among one or more relay nodes and the first and second communication devices for first, second, and third time slots;

receive a first user data stream in the first time slot directly from the first communication device;

receive a second user data stream in the second time slot directly from the second communication device;

receive a network coded first user data stream in a first portion of the third time slot, as sent by one of the one or more relay nodes, the network coded first user data stream being independent of the second user data stream and formed by combining consecutive symbols in the first user data stream;

receive a network coded second user data stream in a different, second portion of the third time slot, as sent by one of the one or more relay nodes, the network coded second user data stream being independent of the first user data stream and formed by combining consecutive symbols in the second user data stream; and decode the received first user data stream, as received in the first time slot, together with the network coded first user data stream, as received in the first portion of the third time slot, and, separately, decode the received second user data stream, as received in the second time slot, together with the network coded second user data stream, as received in the second portion of the third time slot.

* * * * *